(12) United States Patent
Iwasa

(10) Patent No.: US 6,866,140 B2
(45) Date of Patent: Mar. 15, 2005

(54) CONVEYANCE APPARATUS AND BOXING SYSTEM

(75) Inventor: Seisaku Iwasa, Ritto (JP)

(73) Assignee: Ishida Co., Ltd., Kyoto (JP)

(*) Notice: Subject to any disclaimer, the term of this patent is extended or adjusted under 35 U.S.C. 154(b) by 0 days.

(21) Appl. No.: 10/244,549

(22) Filed: Sep. 17, 2002

(65) Prior Publication Data

US 2003/0057058 A1 Mar. 27, 2003

(30) Foreign Application Priority Data

Sep. 26, 2001 (JP) ......................................... 2001-294620

(51) Int. Cl.⁷ ............................................. B65G 47/31
(52) U.S. Cl. ............................... 198/803.13; 198/867.15
(58) Field of Search ...................... 198/803.13, 867.15, 198/867.1, 867.01

(56) References Cited

U.S. PATENT DOCUMENTS

| | | | | |
|---|---|---|---|---|
| 1,853,478 A | * | 4/1932 | Vincent .................. | 198/468.11 |
| 3,052,340 A | * | 9/1962 | Lyons et al. ............... | 198/633 |
| 3,206,005 A | * | 9/1965 | Lyman .................. | 198/867.14 |
| 3,902,587 A | * | 9/1975 | Checcucci ............... | 198/419.3 |
| 4,189,996 A | * | 2/1980 | Ackley et al. ............... | 101/37 |
| 5,000,311 A | * | 3/1991 | Abbestam et al. ..... | 198/867.14 |
| 5,337,887 A | * | 8/1994 | Greenwell et al. ..... | 198/867.14 |
| 5,429,226 A | | 7/1995 | Ensch et al. | |
| 5,529,168 A | * | 6/1996 | Soriano et al. .......... | 198/465.1 |
| 5,755,317 A | * | 5/1998 | Holston .................... | 198/484.1 |
| 5,884,749 A | * | 3/1999 | Goodman ................ | 198/419.3 |
| 6,260,689 B1 | | 7/2001 | Takemoto et al. | |
| 6,382,401 B2 | | 5/2002 | Takemoto et al. | |

FOREIGN PATENT DOCUMENTS

| | | |
|---|---|---|
| DE | 295 21 082 | 9/1996 |
| EP | 0 884 254 | 12/1998 |
| JP | 5-278840 | 10/1993 |
| JP | 2000-6910 | 1/2000 |
| JP | 9-100021 | 2/2000 |
| JP | 2000-43806 | 2/2000 |
| JP | 2000-159319 | 6/2000 |

* cited by examiner

*Primary Examiner*—Douglas Hess
(74) *Attorney, Agent, or Firm*—Shinjyu Global IP Couselors, LLP

(57) ABSTRACT

A conveyance apparatus of the present invention holds and conveys a group of items, and includes conveyors and driving devices. The conveyors include first and second conveyance belts, items-group holders, and detaching/attaching devices. The first and second conveyance belts operate around a circulating path. The detaching/attaching devices support the items-group holders, which include a plurality of partition members that partitions and holds the group of items. The plurality of partition members are connected to one another. The detaching/attaching devices render the items-group holders detachable from and attachable to the first and second conveyor belts. In this manner, replacement of the plurality of partition members can be performed easily and quickly.

15 Claims, 17 Drawing Sheets

CONVEYANCE APPARATUS AND BOXING SYSTEM

BACKGROUND OF THE INVENTION

1. Field of the Invention

This invention generally relates to a conveyance apparatus. The present invention also relates to a boxing system that employs such conveyance apparatus.

2. Background Information

Generally, food items such as potato chips are first packaged in bags and then conveyed to a boxing station by a conveyance apparatus. Then, the bags are boxed in cardboard boxes at the boxing station.

In recent years, there has been an effort to increase the productivity by increasing the processing speed in the field of items-conveyance technology. Japanese Laid-Open Patent Application H5-278840 discloses an example of such a conveyance apparatus. As shown in FIG. 17, the conveyance apparatus A has first and second chains B1 and B2, which are annular and parallel to each other. The first and second chains B1 and B2 are disposed parallel to the conveyance direction of the items X . . . X. (See the arrow in FIG. 17.) Each of the chains B1 and B2 is driven independently by driving devices which are not shown in the Figure. Each of the chains B1 and B2 has a plurality of partition members C . . . C, which is disposed upright with a predetermined space in between. These partition members C . . . C create a pair of first items-holder groups D11 and D12 in the first chain B1 and a pair of second items-holder groups D21 and D22 in the second chain B2. Each of the pairs holds a predetermined number of items (ten in FIG. 17). The first items-holder groups D11 and D12 and the second items-holder groups D21 and D22 are formed alternately in the conveyance direction.

In this manner, for instance, one of the first items-holder groups D11, which is conveyed intermittently by the first chain B1, receives ten items X . . . X from an upstream-side loading conveyer E at the loading position P1. During the loading, the other of the first items-holder groups D12 is finished with the discharge of items X . . . X, and starts moving toward the loading position P1, being conveyed intermittently on the position shown in FIG. 17.

One of the second items-holder groups D21, which has already received ten items X . . . X, is stopped at the discharge position P2 after being conveyed by the second chain B2. A comb-shaped pusher F pushes out the items X . . . X from the second items-holder group D21 all at once. During the discharge, the other of the second items-holder groups D22 is on its way to the loading position P1, being stopped at the position shown in the Figure.

Once the second items-holder group D21 is finished with the discharge, the second items-holder group D21 starts moving toward the loading position P1. Also, once the first items-holder group D11 is finished with the loading, the first items-holder group D11 starts moving toward the discharge position P2, where the items X . . . X are discharged. After the first items-holder group D11 leaves the loading position P1, the second items-holder group D22 approaches the loading position P1, where the items X . . . X are loaded from the loading conveyer E to the second items-holder group D22.

By repeating such operations with each of the items-holder groups D11, D12, D21, and D22, it is possible to perform loading, conveyance, and discharge of the items X . . . X efficiently. As a result, it is possible to increase the speed with which the items X . . . X are processed.

However, in such conveyance apparatus A, the partition members C . . . C are fixedly coupled to the first and second chains B1 and B2. Therefore, it is impossible to adjust the number of partition members C . . . C or the space secured between the partition members C . . . C right away in response to a change in the thickness of the items X . . . X or the number of items to be conveyed per group when the type of items to be conveyed has changed.

As a conveyance apparatus that solves the aforementioned problem, one that is disclosed in Japanese Laid-Open Patent Application H09-100021 is known. In this conveyance apparatus, an items-group holder is formed by connecting a plurality of partition members in series. The items-group holder is detachably and reattachably supported by a conveyor via connecting pins that project from the conveyor (conveyor belt or conveyance chain).

In this manner, when the items-group holder needs to be replaced, the items-group holder can be detached from and reattached to the conveyor easily by releasing and re-connecting the connecting pins.

However, even in such conveyance apparatus, malfunctions can occur. More specifically, the connecting mechanism, in other words the detaching/attaching mechanism with such connecting pins, generally does not have good supporting ability. This presents a problem where the conveyance apparatus is operated at a high speed. Also, when the items-group holder is replaced in response to a change in the items, driving conditions such as operational speed of the conveyor and the stop timings have to be reconfigured. This process can be time consuming.

In view of the above, there exists a need for conveyance apparatus which overcomes the above mentioned problems in the prior art. This invention addresses this need in the prior art as well as other needs, which will become apparent to those skilled in the art from this disclosure.

SUMMARY OF THE INVENTION

An object of the present invention is to provide a conveyance apparatus and a boxing system that can convey various items in batches and in predetermined positions stably, that can be promptly reconfigured when the items to be packaged need to be changed, and that are capable of high-speed processing.

The conveyance apparatus of the present invention holds and conveys a group of items. The conveyance apparatus includes a first conveyor. The first conveyor includes a conveyance member, a first items-group holder for conveying the group of items, and a first detaching/attaching mechanism. The first items-group holder has a plurality of partition members that is connected to one another. The first detaching/attaching mechanism is disposed between the first conveyance member and the first items-group holder for detachably and reattachably coupling the first items-group holder to the first conveyance member.

When the items to be packaged are changed to items that have a different shape (such as thickness) or a means of conveyance (such as the number of items in a group), the plurality of partition members that matches the shape needs to be used in order to convey the items stably. In this invention, the plurality of partition members is coupled to one another and is rendered detachable from and attachable to the annular conveyance member. Therefore, the partition members can be replaced easily and quickly.

Either all of the plurality of partition members can be coupled to one another such that the plurality of partition members can be detached and attached all at once, or the plurality of partition members can be divided into several assemblies of partition members such that each of the assemblies is independently detachable and attachable. Where the plurality of partition members is divided into several assemblies of partition members, the assemblies can be either connected to one another, or not connected to one another.

Preferably, in the conveyance apparatus, the number of the detaching/attaching means is smaller than the number of the partition members.

In the conveyance apparatus of the related art, there is one detaching/attaching means for each of the partition members. In this invention, since the plurality of partition members is coupled to one another, the number of the detaching/attaching members can be fewer than the number of the partition members.

Preferably, in the conveyance apparatus, the first detaching/attaching mechanism can render the plurality of partition members detachable from and attachable to the annular conveyance member all at once.

In the conveyance apparatus of the conventional art, there is one detaching/attaching means for each partition member. Therefore, each partition member has to be detached and attached independently. In this invention, since the plurality of partition members is coupled to one another, the plurality of partition members can be detached from and attached to the annular conveyance member all at once.

Preferably, in the conveyance apparatus, the first detaching/attaching means includes a clamping member and a clamped member that is clamped by the clamping member. When the clamping member is fixedly coupled to the first conveyance member, the clamped member is fixedly coupled to the partition member. Where the clamping member is fixedly coupled to the partition member, the clamped member is fixedly coupled to the first conveyance member.

Here, the plurality of partition members is coupled to the first conveyance member by having the clamping member clamp the clamped member. Also, the plurality of partition members is detached from the first conveyance member by releasing the clamping of the clamped member by the clamping member.

Preferably, in the conveyance apparatus, the clamping member is formed by an elastic body. The clamped member is formed by an axis member that is clamped by the clamping member from the conveyance-direction front and rear.

Here, the plurality of partition members is coupled to the first conveyance member by clamping the axis member with the elastic clamping member. Also, the plurality of partition members is detached from the first conveyance member by releasing the clamping of the axis member by the clamping member.

Preferably, in the conveyance apparatus, the clamping member is formed by an elastic body The clamped member has an engagement portion on both sides. The engagement portion is clamped by the clamping member from both conveyance-width direction sides. The conveyance-width direction is horizontal and perpendicular to the conveyance direction.

Here, the plurality of partition members is coupled to the first conveyance member by clamping the engagement portion of the clamped member with the elastic clamping member. Also, the plurality of partition members is detached from the first conveyance member by releasing the clamping of the engagement portion of the clamped member by the clamping member.

Preferably, in the conveyance apparatus, each partition member includes a bottom portion and a partition surface portion. The partition surface portion projects upright from the bottom portion. The bottom portions of the plurality of partition members are connected to one another.

Here, the plurality of partition members is connected to one another by connecting the bottom portions to one another. Items-holding spaces are formed by the partition surface portions, which project from the bottom portions of the partition members. The items-holding spaces, with each of the items-holding spaces holding one of the group of items, convey the items following the operation of the first conveyance member. By positioning the discharge device at a position that conforms to the pitch of the items-holding spaces that are formed by the partition surface portions, it is possible to box the items in a cardboard box such that the items are neatly aligned.

Preferably, in the conveyance apparatus, the bottom portions of the plurality of partition members are connected to one another via a hinge mechanism.

Here, the bottom portions of the partition members are connected to one another via the hinge mechanism. Therefore, the partition surface portions can move smoothly following the operation of the first conveyance member. As a result, it is possible to prevent shock during the conveyance of the items. This effect is particularly evident during the high-speed operation. Furthermore, where the first conveyance member turns around, the spaces between the upper portions of adjacent partition members, which are connected via the hinge mechanism, expand. This facilitates insertion of the items in the spaces.

Preferably, the conveyance apparatus further includes a first driving device, a detecting device, and a control system. The driving device drives the first roller. The detecting device detects conveyance of either the group of items or the plurality of partition members, and produces a detection signal. The control system includes memory means and driving control means. The memory means is operatively coupled to the detecting device to receive the detection signals and stores the detection signals as holding parameters. The driving control means is operatively coupled to the first driving device to control driving of the first roller based on the holding parameters. For instance, the driving control means controls the operational speed and the stop timings of the first conveyance member based on the holding parameters detected based on the configurations of the partition members.

Here, since the driving of the first conveyance member is controlled based on the holding parameters, even when the plurality of partition members is replaced in response to a change in the shape of items to be conveyed or the means of conveyance, adequate driving conditions of the annular conveyance member can be configured automatically based on the holding parameters of the partition members.

The holding parameters include, for instance, the number of the partition members, which determines the number of items-holding spaces, and the space between adjacent partition members.

Preferably, the conveyance apparatus further includes a second conveyor and a second driving device. The second conveyor includes a second roller, a second conveyance member, a second items-group holder, and a second detaching/attaching mechanism. The conveyance member is wound around the second roller. The second items-group holder conveys the group of items. The second items-group holder has a plurality of partition members that is connected to one another. The second detaching/attaching mechanism is disposed between the second conveyance member and the second items-group holder for detachably and reattachably coupling the second items-group holder to the second conveyance member. The second driving device drives the second roller. The partition members of the first and second items-group holders are divided into a plurality of assemblies of partition members. At least two adjacent assemblies out of the plurality of assemblies are supported by different conveyance members. The driving control means controls the driving of the first and second rollers independently.

Here, the conveyance process can be performed efficiently. Therefore, high-speed processing of conveyance of the items is possible.

The boxing system of the present invention includes the conveyance apparatus as set forth above, a loading apparatus, and an unloading apparatus. The loading apparatus loads items onto the conveyance apparatus at a loading position. The unloading apparatus unloads the group of items conveyed by the conveyance apparatus to a container at a discharge position.

Preferably, in the boxing system, the unloading apparatus discharges the group of items at the discharge position by pushing in the conveyance-width direction. The conveyance-width direction is horizontal and perpendicular to the conveyance direction.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

First Embodiment

The conveyance apparatus in accordance with the first embodiment of the present invention will now be described. In the following description, "front" and "rear" respectively refer to the lower-stream and upper-stream sides of the conveyance direction, while "left" and "right" respectively refer to the left and right sides relative to the conveyance direction.

<Entire Structure of Boxing Line>

Figure 1:
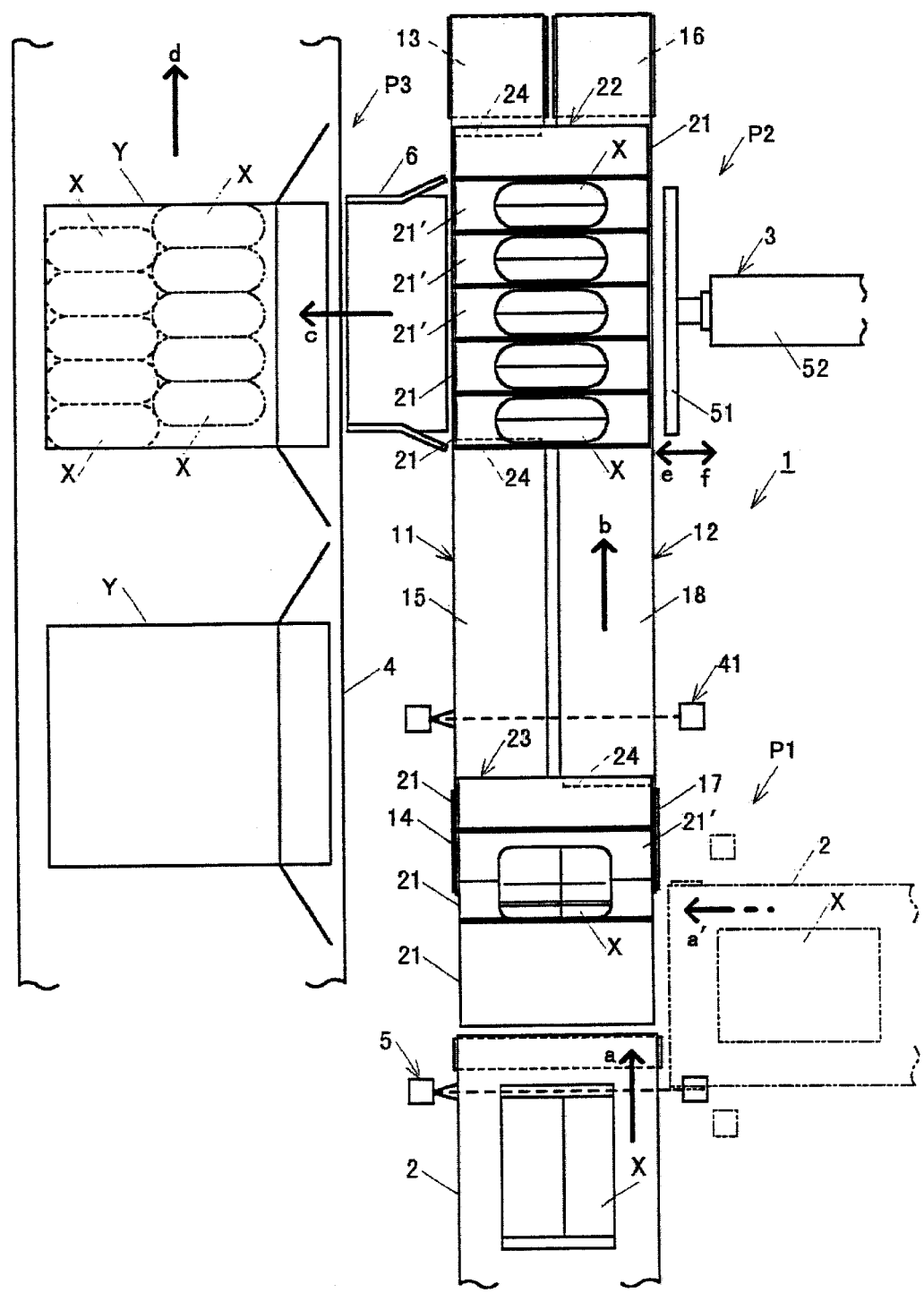
FIG. 1 is a schematic plan view of an entire structure of a boxing line that utilizes the conveyance apparatus in accordance with a first embodiment of the present invention.
Figure 2:
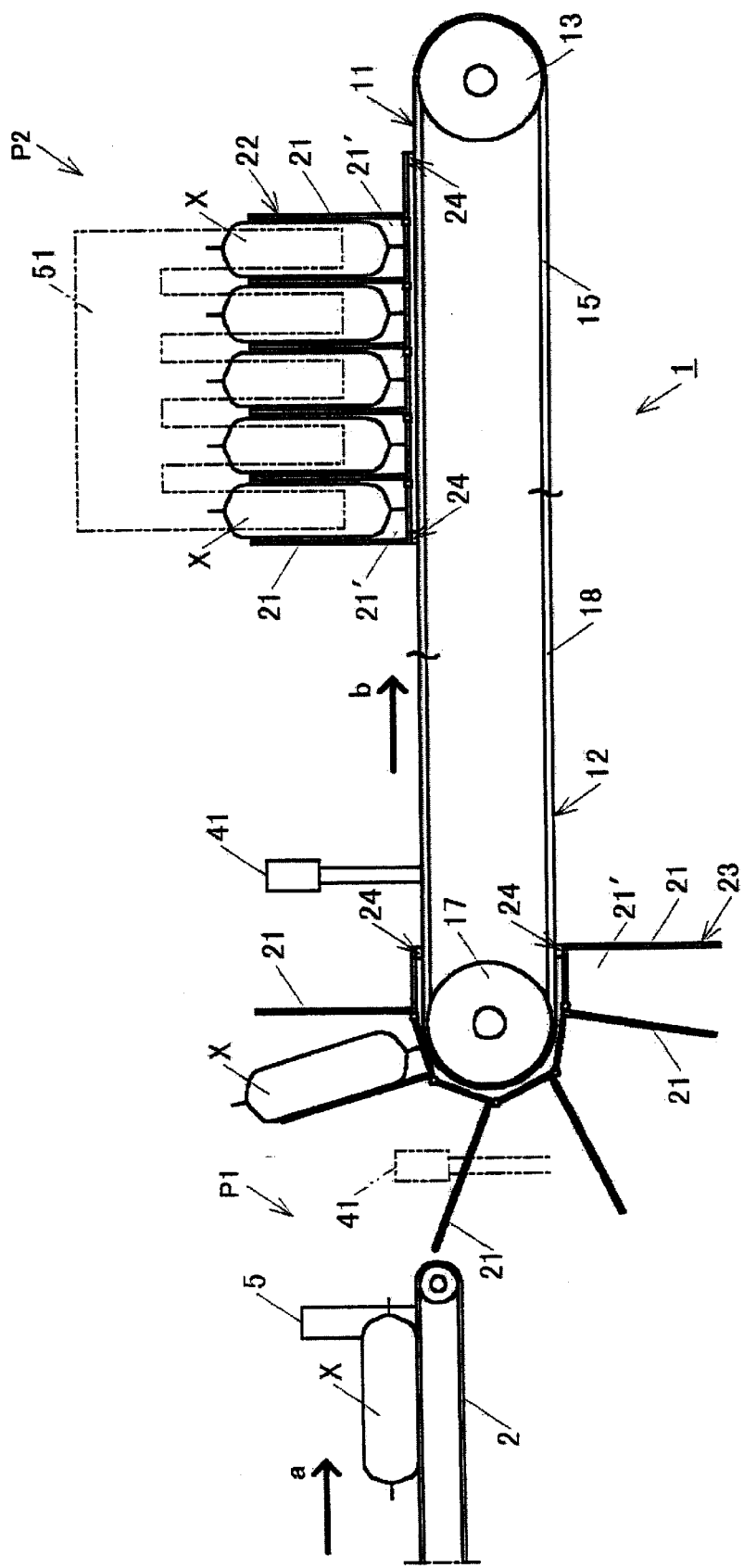
FIG. 2 is a schematic side view of the conveyance apparatus.

The conveyance apparatus 1 in accordance with the first embodiment of the present invention is employed in a boxing line as shown in FIGS. 1 and 2.

This boxing line 100 is for compactly boxing items X . . . X, which are preferably food items such as potato chips packaged in bags. The boxing line 100 includes a loading conveyor 2, a discharge device (unloading apparatus) 3, and an unloading conveyor 4. The loading conveyor 2 is disposed on the upper-stream side of the conveyance apparatus 1. The loading conveyor 2 conveys items X . . . X from an apparatus on the further upper-stream side (for instance, a bag-manufacturing packaging apparatus) in a direction shown as arrow "a" and loads the items X . . . X onto the conveyance apparatus 1 at a loading position P1. The discharge device 3 is disposed on a side of the down-stream side of the conveyance apparatus 1. The discharge device 3 discharges the items X . . . X, which are conveyed by the conveyance apparatus 1 in the direction shown as arrow "b," at the discharge position P2 in the direction shown as arrow "c" towards the other side of the conveyance apparatus 1. The unloading conveyor 4 conveys cardboard boxes Y . . . Y, which are disposed on the side of the unloading conveyor 4 and in which the discharged items X . . . X are boxed at the boxing position P3, further downstream as shown in the arrow "d."

First photoelectric sensors (example of detecting device) 5 are disposed near the end of the loading conveyor 2 such that the loading conveyor 2 is in between the first photoelectric sensors 5. The first photoelectric sensors 5 detect the items X . . . X to be loaded onto the conveyance apparatus 1, and sends a detection signal to a control unit 61 shown in FIG. 7. A guiding table 6 is placed on the discharge path of the items X . . . X between the conveyance apparatus 1 and the unloading conveyor 4 to guide the items X . . . X into the cardboard boxes Y . . . Y.

<Conveyance Apparatus>

(Conveyance Mechanism)

The conveyance apparatus 1 has a pair of first and second conveyors (conveyance member) 11 and 12, and a pair of first and second driving devices 11' and 12'. The first and second conveyors are disposed on the left and right sides so as to be parallel with the conveyance direction of the items X . . . X shown as arrow "b." The first conveyor 11 has toothed rollers 13 and 14 which are disposed on the front and rear, and a first conveyance belt 15 which is annular, toothed, and wound around the rollers 13 and 14. On the other hand, the second conveyor 12 has toothed rollers 16 and 17 which are disposed on the front and rear, and a second conveyance belt 18 which is annular, toothed, and wound around the rollers 16 and 17.

Figure 7:
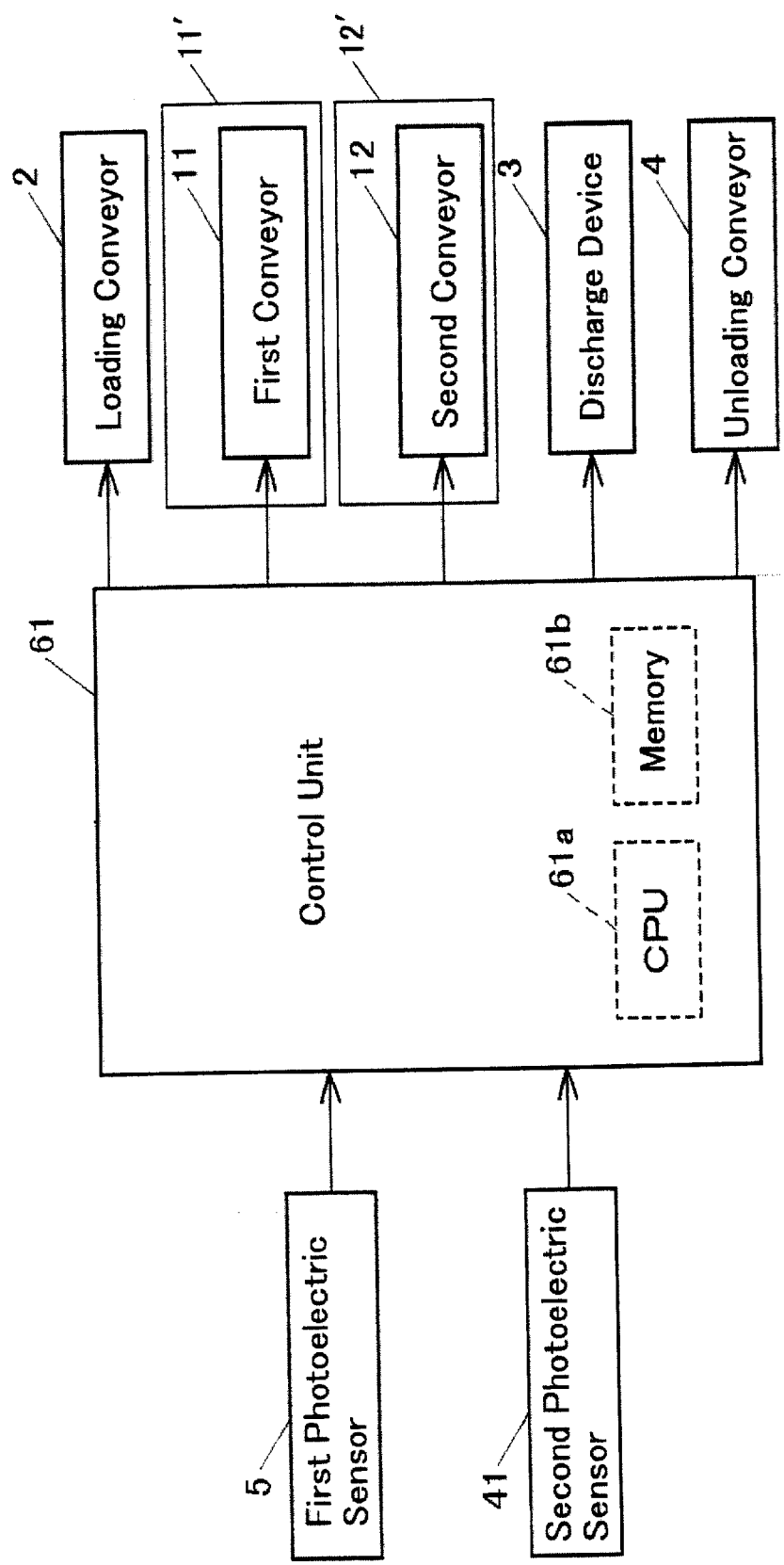
FIG. 7 is a view of the control system of the boxing line.

The first and second driving devices 11' and 12' are embodied by conventional devices such as motors. Since motors are well known in the art, these structures will not be discussed or illustrated in detail herein. As driving force from the first and second driving devices 11' and 12' shown in FIG. 7 is transmitted respectively to the front rollers 13 and 16, the conveyance belts 15 and 18 are driven independently to perform the operation.

(Structure of Items-Group Holder)

Figure 3:
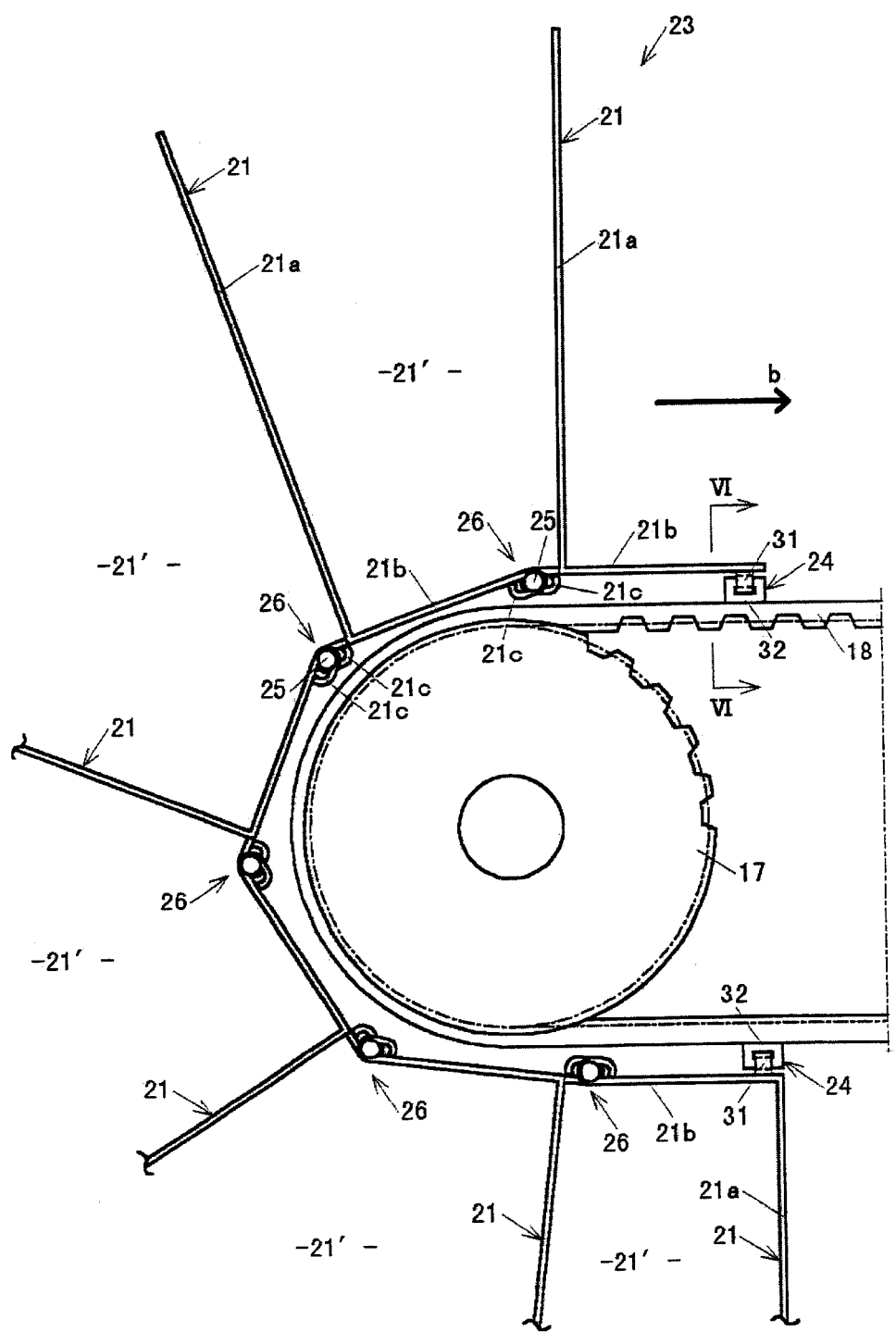
FIG. 3 is an enlarged side view of the vicinity of the upper side roller of the conveyance apparatus.

A first items-group holder 22 is detachably and reattachably coupled to the first conveyor belt 15 via a pair of detaching/attaching devices 24 and 24 that is disposed on front and rear. The first items-group holder 22 has a predetermined number (6 in the figures) of L-shaped partition members 21 . . . 21 that is disposed with a predetermined space therebetween. The partition members 21 . . . 21 are connected in series, with each of the partition members 21 being disposed parallel with the conveyor-width direction. Similarly, a second items-group holder 23 is detachably and reattachably coupled to the second conveyor belt 18 via a pair of detaching/attaching devices 24 and 24 that is disposed on the front and the rear. As shown in FIG. 3, the second group holder 23 is detached from the conveyor belt 18 by merely operating the pair of detaching/attaching devices 24 and 24 to detach a hook member 31 (to be described later) from a receptacle 32 (to be described later). The second items-group holder 23 has a predetermined number (6 in the figures) of L-shaped partition members 21 . . . 21 that is disposed with a predetermined space therebetween. The partition members 21 . . . 21 are connected in series, with each of the partition members 21 being disposed parallel with the conveyor-width direction.

A predetermined number (5 in the figures) of item holders 21' . . . 21' are formed in between adjacent partition members 21 . . . 21, such that each of the item holders 21' . . . 21' can hold one item X. As will be described later, the partition members 21 . . . 21 are sized conveyor-widthwise to bridge over both of the conveyor belts 15 and 16.

(Coupling Structure of Partition Members)

The first items-group holder 22 and the second items-group holder 23 have the same or similar structures. The coupling structure of the partition members 21 . . . 21 will be described taking the latter as an example.

Figure 4:
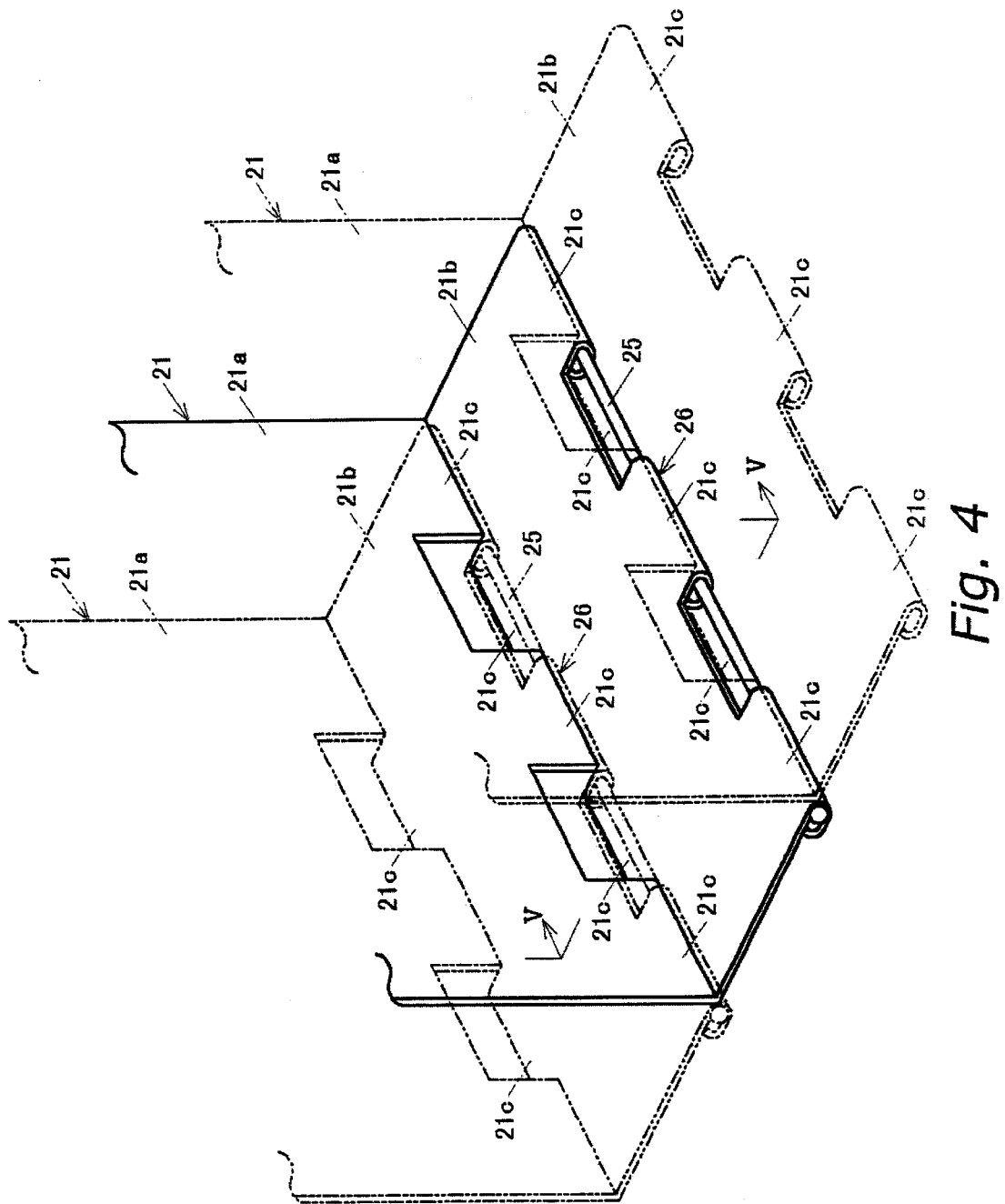
FIG. 4 is a perspective view that depicts the coupling structure of the partition members.
Figure 5:
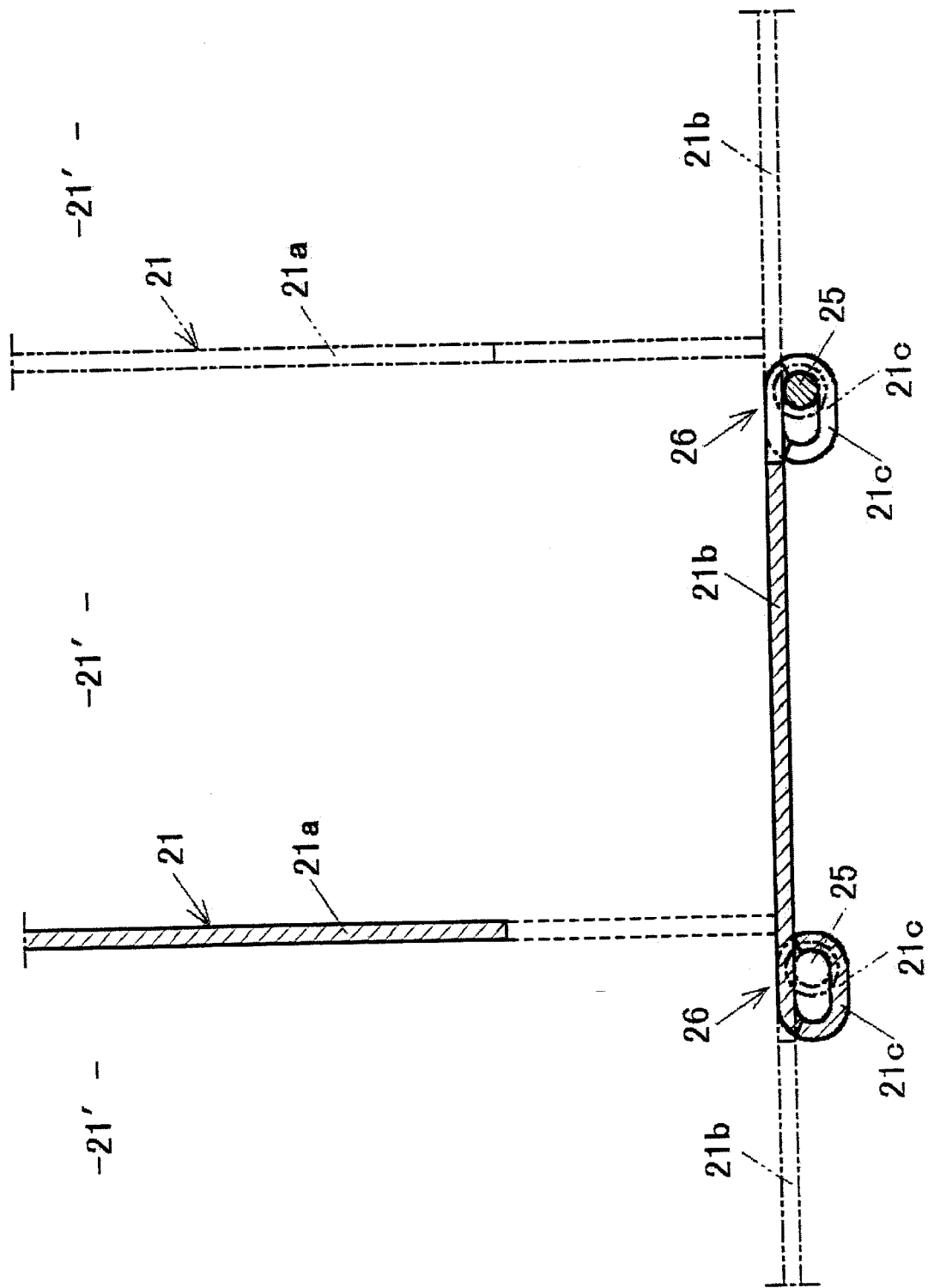
FIG. 5 is an enlarged cross-sectional view of the selected portion of the coupling structure as viewed from the arrow V—V in FIG. 4.

As shown in FIGS. 3–5, each partition member 21 has the shape of letter L in the elevational view, with a partitioning surface portion 21a and a bottom portion 21b that are sized to conform with the size of the item X to be conveyed. The partition members 21, except for the ones at front and rear ends, have a plurality of curved portions 21c . . . 21c (3 on the front and 2 on the rear in the figures) formed at the front and rear of the bottom portions 21b. The curved portions 21c form an oval space that extends in the conveyor-width direction. The partition member 21 on the front end has two curved portions 21c on its rear, while the partition member 21 on the rear end has three curved portions 21c on its front. The second items-group holder 23, in other words the items holders 21' . . . 21' is structured by the six partition members 21. The adjacent items holders 21' . . . 21' are directly connected to one another as one unit via the curved portions 21c . . . 21c and a plurality of (five in the figures) hinge mechanisms 26 . . . 26. The hinge mechanism 26 includes a pin 25 that penetrates the oval space of the curved portions 21c . . . 21c.

(Detaching/attaching Mechanism of Items-Group Holder)

The detaching/attaching device 24 will be described similarly taking the second items-group holder 23 as an example.

Figure 6:
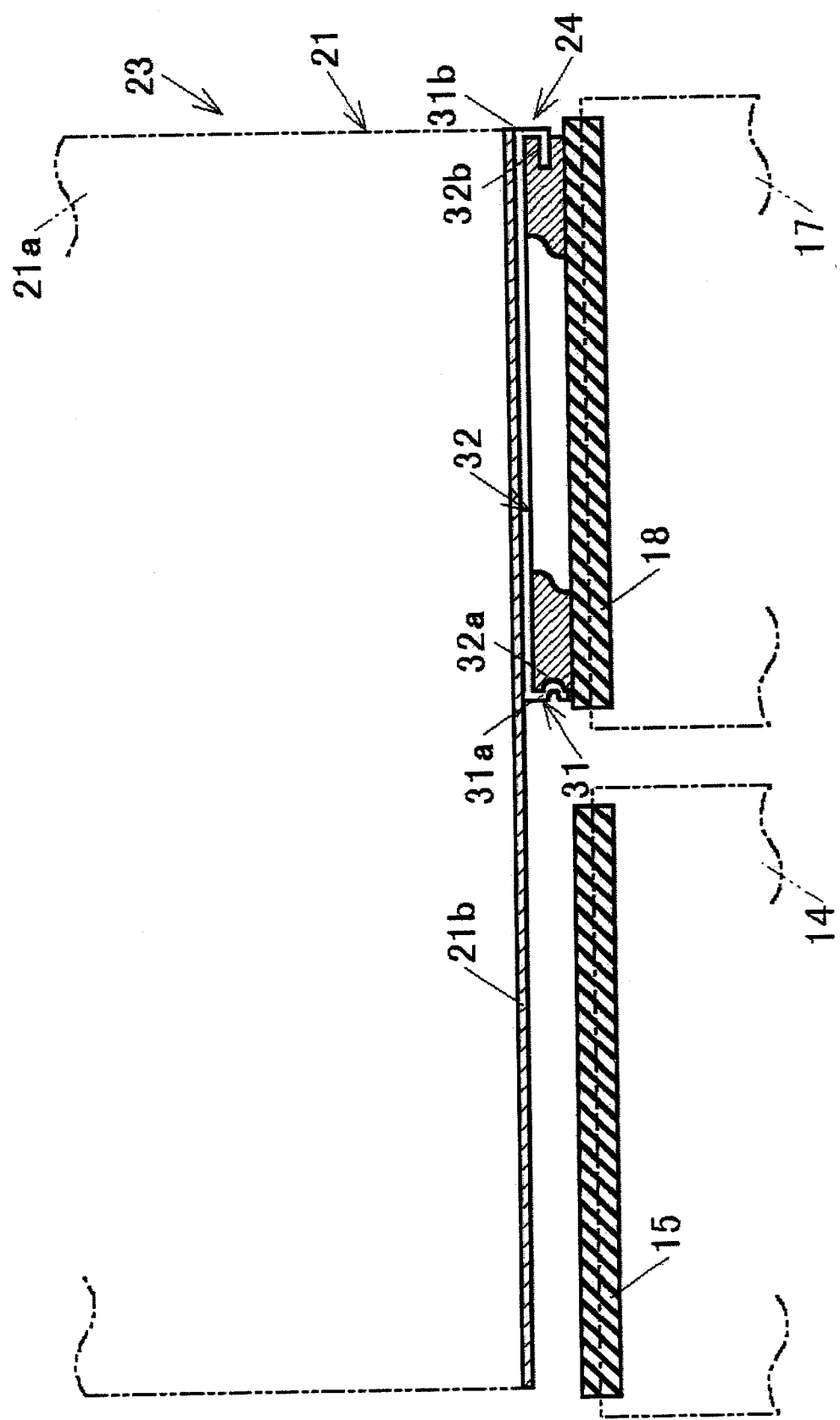
FIG. 6 is a partially broken cross-sectional view of the selected portion of the conveyance apparatus as viewed from the arrow VI—VI in FIG. 3, which depicts the detaching/attaching mechanism.

As shown in FIGS. 3 and 6, a detaching/attaching mechanism 24' is disposed in between the second items-group holder 23 and the second conveyance belt 18. The detaching/attaching mechanism 24' includes two of the detaching/attaching devices 24, each of which includes a hook member 31 and a receptacle 32. The hook member 31 includes a plate spring that is fixed to the bottom surface of the second items-group holder 23, in other words the bottom surface of the bottom portion 21b of the partition member 21. The hook member 31 is elongated in the conveyor-width direction. The receptacle 32 is fixed to the upper surface of the conveyor belt 18, and is elongated in the conveyor-width direction. The hook member 31 can be coupled to the receptacle 32 by coupling side portions 31a and 31b with concave portions 32a and 32b. The side portions 31a and 31b are formed by bending the left and right sides of the hook member 31 in different shapes. The concave portions 32a and 32b are formed by shaping the left and right sides of the receptacle 32 differently so as to match the shapes of the side portions 31a and 31b. Here, the side portions 31a and 31b and the concave portions 32a and 32b are formed such that the left side portion 31a and the left concave portion 32a engage each other relatively shallowly, while the right side portion 31b and the right concave portion 32b engage each other relatively deeply.

Left half portions of the partition members 21 . . . 21 extend above the first conveyor belt 15 without touching the first conveyor belt 15. The second items-group holder 23 is supported by the-front and rear detaching/attaching devices 24 and 24 of the second conveyor belt 18 in a cantilever manner.

Regarding the first items-group holder 22, similar detaching/attaching devices 24 and 24 are disposed in between the first items-group holder 22 and the first conveyor belt 15. Accordingly, explanation of the first items-group holder 22 will be omitted.

(Second Photoelectric Sensor)

As shown in FIGS. 1 and 2, second photoelectric sensors 41 are placed at appropriate positions on the upstream side of the conveyance apparatus 1, such that the conveyors 11 and 12 are positioned in between the two second photoelectric sensors 41. The second photoelectric sensors 41 detect the number of the partitioning surface portions 21a . . . 21a or spaces between the partitioning surface portions 21a . . . 21a of the partitioning members 21 . . . 21 formed in the items-group holders 22 and 23 that pass the second photoelectric sensors 41.

<Discharge Device>

As shown in FIGS. 1 and 2, the discharge device 3 has the shape of a comb, which can penetrate each of the item holders 21' . . . 21' of the items-group holders 22 and 23. The discharge device 3 includes a pusher member 51 and an air cylinder 52. The pusher member 51 pushes the items X . . . X held by each of the item holders 21' . . . 21' all at the same time. The air cylinder 52 moves the pusher member 51 in a direction that is perpendicular to the conveyance path, in other words in the direction shown as "e" and "f." The pusher member 51 can be alternatively driven by using a solenoid or a motor, instead of the air cylinder 52.

<Control System>

The control system of this boxing line is shown in FIG. 7. This control system includes the control unit 61 (driving control means and memory means) that controls the boxing line overall. The control unit 61 includes a CPU 61a that performs various calculation processes, and a memory 61b that stores initial configuration for each item and various control parameters.

The control unit 61 preferably includes a microcomputer with a control program that controls the first and second driving devices 11' and 12' as discussed below. The control unit 61 can also include other conventional components such as an input interface circuit, an output interface circuit, and storage devices such as a ROM (Read Only Memory) device and a RAM (Random Access Memory) device. The memory circuit stores processing results and control programs such as ones for driving control operation that are run by the processor circuit.

As seen in FIG. 7, the control unit 61 is operatively coupled to the first and second photoelectric sensors 5 and 41, the loading conveyor 2, the first and second conveyors 11 and 12, the discharge device 3, and the unloading conveyor 4. The control unit 61 is capable of selectively controlling any of the components of the control system in accordance with the control program. It will be apparent to those skilled in the art from this disclosure that the precise structure and algorithms for control system can be any combination of hardware and software that will carry out the functions of the present invention.

The CPU 61a outputs control signals to the loading conveyor 2, the first and second conveyors 11 and 12, the discharge device 3, and the unloading conveyor 4 to control driving of these devices. The CPU 61a receives inputs of detection signals from the first and second photoelectric sensors 5 and 41.

The memory 61b stores control parameters such as: the timing of the intermittent driving of the first and second conveyors 11 and 12, which is detected by the first photoelectric sensors 5 at the loading position P1 for each of the items X; the number of items X . . . X loaded per group; the conveyance speed and the conveyance time of the first and second conveyors 11 and 12 from the loading position P1 to the discharge position P2; the moving strokes of the pusher member 51 of the discharge device 3; and the timings of the intermittent driving of the unloading conveyor 4. The memory 61b stores holding parameters such as the number of partitioning surface portions and the space between the partitioning surface portions for each of various models of the items-group holder.

<Effect of the Present Embodiment>

Effects of the conveyance apparatus 1 will now be described.

Referring to the conveyance operation, while the second items-group holder 23 is adjacent to the loading position P1, the CPU 61a of the control unit 61 drives the second conveyor belt 18 intermittently by a predetermined pitch, in other words by a space of the item holder 21', based on the item detection signals from the first photoelectric sensors 5. In this case, the loading conveyor 2, which carries the items X . . . X, also operates intermittently.

In other words, once the item X is detected by the first photoelectric sensors 5, the second conveyor belt 18 is stopped until a predetermined period of time elapses after the first photoelectric sensors 5 stop detecting items X. Once this predetermined period of time elapses, the second conveyor belt 18 operates only by a predetermined pitch. During this operation, the loading conveyor 2 is stopped. Next, when the second conveyor belt 18 stops, the loading conveyor 2 starts its operation. When five items X . . . X are supplied to the second items-group holder 23 by repeating these operations, the loading conveyor 2 stops. Then, the loading conveyor 2 repeats the aforedescribed operations when the first items-group holder 22 arrives.

In this manner, each of the item holders 21' . . . 21' of the second items-group holder 23 is provided with one of the items X . . . X, such that five items X . . . X are supplied to and held by the item holders 21' . . . 21' in the upright posture.

On the other hand, the first items-group holder 22, which already holds five items X . . . X in its item holders 21' . . . 21', arrives at the discharge position P2 after being conveyed by the first conveyor belt 15, and stops there. Then, as the pusher member 51 of the discharge device 3 moves onto the conveyance path, the items X . . . X held in the item holders 21' . . . 21' are all pushed out. The items X . . . X are packed in the cardboard box Y compactly in the upright position at the boxing position P3 after passing the guiding table 6. (See the drawing in chain line in FIG. 1.) The cardboard box Y is placed on the unloading conveyor 4 so as to oppose the discharge device 3 with the conveyance apparatus 1 therebetween. As the cardboard box Y, in which the predetermined number of items X . . . X are packed, is conveyed downstream by the unloading conveyor 4, a new empty cardboard box Y is conveyed from upstream, and stops at the position opposing the discharge device 3.

Once its item holders 21' . . . 21' are emptied, the first items-group holder 22 starts moving toward the loading position P1 on the first conveyor belt 15.

After the first items-group holder 22 leaves the discharge position P2, the second items-group holder 23, which has items X . . . X in its item holders 21' . . . 21' arrives at the discharge position P2. Then, the items X . . . X are discharged from the second items-group holder 23 in the same manner as described above regarding the first items-group holder 22. In the mean time, the first items-group holder 22 receives the items X . . . X at the loading position P1, in the same manner as described above regarding the second items-group holder 23.

In this manner, the first conveyor 11 and the second conveyor 12, in other words the first conveyor belt 15 and the second conveyor belt 18 are driven independently. While items X . . . X are discharged from the first items-group holder 22 or the second items-group holder 23 at the discharge position P2, the second items-group holder 23 or the first items-group holder 22 can receive items X . . . X from the loading conveyor 2 at the loading position P1. By repeating such operations intermittently, it is possible to perform the conveyance of items X . . . X at a high speed.

Since the partition members 21 . . . 21 that form the items-group holders 22 and 23 have the shape of letter L, the partition members 21 . . . 21 stand upright relative to the conveyor surface. Accordingly, there is no need for a complicated mechanism to support the items X . . . X in the upright position. Therefore, the structure of the conveyance apparatus can be kept simple, and its design can be simplified.

Also, the partition members 21 . . . 21 are connected to one another by connecting the bottom portion 21b . . . 21b with one another via the hinge mechanisms 26 . . . 26. Therefore, the items-group holders 22 and 23 are smoothly conveyed, following the movement of the conveyor belts 15 and 18. As a result, it is possible to prevent shock during the conveyance of the items X . . . X. This effect is particularly evident during the high-speed operation. Furthermore, at the loading position P1, in other words where the conveyor belts 15 and 18 turn around, the spaces between the upper portions of adjacent partition surface portions 21a . . . 21a, which are connected via the hinge mechanisms 26 . . . 26, expand. Accordingly, the items X . . . X can be loaded from the loading conveyor 2 onto the items-group holders 22 and 23 smoothly.

The partition members 21 . . . 21 are connected as one unit via a plurality of hinge mechanisms 26 . . . 26, which includes the curved portions 21c . . . 21c and the pins 25 that extend through the oval tubular spaces of the curved portions 21c . . . 21c. These partition members 21 . . . 21 are movable in the conveyance direction relative to each other. Therefore, the items-group holders 22 and 23 can be conveyed even more smoothly by following the conveyor belts 15 and 18, which operate in a circulating manner. Particularly, the items-group holders 22 and 23 can follow the conveyor belts 15 and 18 favorably even at portions where the conveyor belts 15 and 18 turn around.

Furthermore, since the detaching/attaching devices 24 are installed, it is easy to detach and reattach the items-group holders 22 and 23 from and to the conveyor belts 15 and 18. Since the number of detaching/attaching devices 24 and 24 provided with each of the items-group holders 22 and 23 is fewer (two in this embodiment on the front and rear) than the number of partition members 21 . . . 21 (six in this embodiment), it is much easier to detach and attach the items-group holders than the case where each of the partition members 21 . . . 21 needs to be individually attached to and detached from the conveyor belts.

Referring to the second items-group holder 23 in FIG. 6 as an example, the second items-group holder 23 can be attached to the second conveyor belt 18 easily by coupling the right side portion 31b of the hook member 31, which is a plate spring, and the right concave portion 32b of the receptacle 32 deeply first, and then coupling the left side portion 31a of the hook member 31 and the left concave portion 32a of the receptacle 32, pushing the second items-group holder 23 from above. On the other hand, when the second items-group holder 23 needs to be detached from the second conveyor belt 18, the second items-group holder 23 is first pulled up to disengage the engagement of the left side portion 31a of the hook member 31 and the left concave portion 32a of the receptacle 32a. Then, the right side portion 31b of the hook member 31 and the right concave portion 32b of the receptacle 32 can be disengaged from each other.

Alternatively, the left side portion 31a of the hook member 31 and the left concave portion 32a of the receptacle 32 can have the same or similar structure as the right side portion 31b and the right concave portion 32b. In this manner the receptacle 32 is clamped tightly by the hook member 31 on both of its conveyor-width direction sides. Therefore, even during high-speed operation, the holder 23 can be supported by the conveyor belt 18 securely against the centrifugal force that occurs where the conveyor belt 18 turns around.

Referring to FIGS. 1, 2, and 7, when the type of items is changed, the items-group holders 22 and 23 may need to be replaced with a new type of items-group holders. In that case, it is possible, with the second photoelectric sensors 41, to detect the holding parameters of the items-group holders 22 and 23 such as the number of partitioning surface portions and the spaces between adjacent partitioning surface portions.

Once the detection signals are inputted from the photoelectric sensors 41 to the CPU 61a, the CPU 61a retrieves from the database stored in the memory 61b the control parameter that matches the detection signal. Then, the CPU 61a outputs driving control signals to related apparatuses such as the loading conveyor 2, the discharge device 3, the unloading conveyor 4, and the first and second conveyors 11 and 12, in other words the first and second conveyor belts 15 and 18. That is, the timings at which the loading conveyor 2 moves from the loading position P1 and at which the conveyor belts 15 and 18 move toward the discharge position P2 are thus controlled.

In this manner, the conveyance apparatus 1 is driven under conditions that are adequate for the new items-group holders. That way, operation of the conveyance apparatus 1 can be automated even further.

Figure 17:
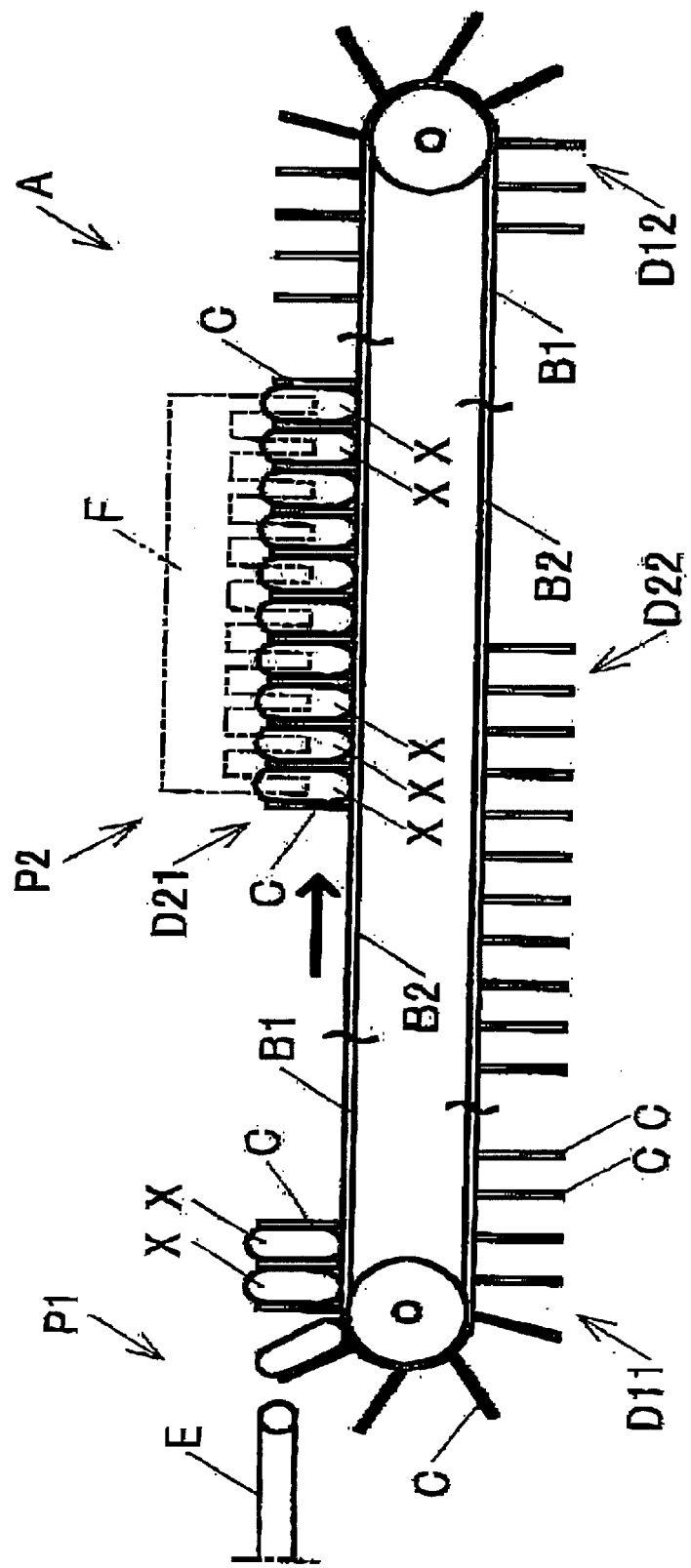
FIG. 17 is a schematic side view for explaining the problem of conventional conveyance apparatuses.

Description of a structure such as the one shown in FIG. 17, in which each of the conveyor belts 15 and 18 has a plurality of items-group holders 22 . . . 22 and 23 . . . 23a and the items-group holders 22 . . . 22 and 23 . . . 23 that are disposed alternately in the conveyance direction, is omitted. In this case also, the detaching/attaching device 24 as described above can be employed. Accordingly, effects of the afore-described embodiment can still be obtained. Furthermore, by performing fine driving controls of the conveyor belts 15 and 18, it is possible to perform loading, conveyance, and discharge of the items X . . . X efficiently. In this manner, it is possible to increase the speed with which items X . . . X are processed even more.

Second Embodiment

Next, a second embodiment of the present invention will be explained. To simplify the explanation, only the second items-group holder 23 is mainly explained. Structural elements that are the same as those in the first embodiment are given the same referential numerals as long as doing so does not cause any confusion.

Figure 8:
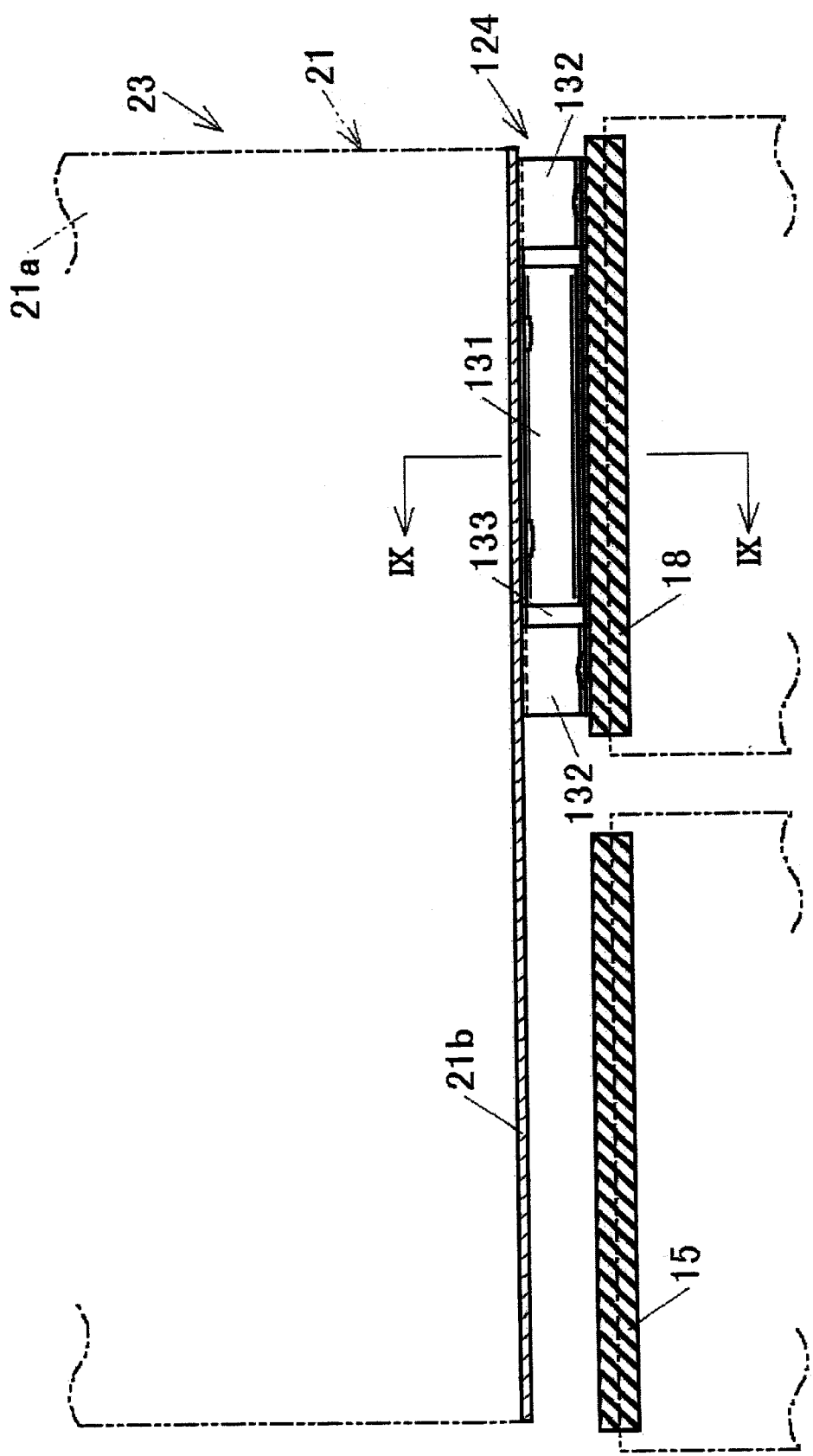
FIG. 8 is a view equivalent to FIG. 6, showing the detaching/attaching mechanism in accordance with a second embodiment of the present invention.
Figure 9:
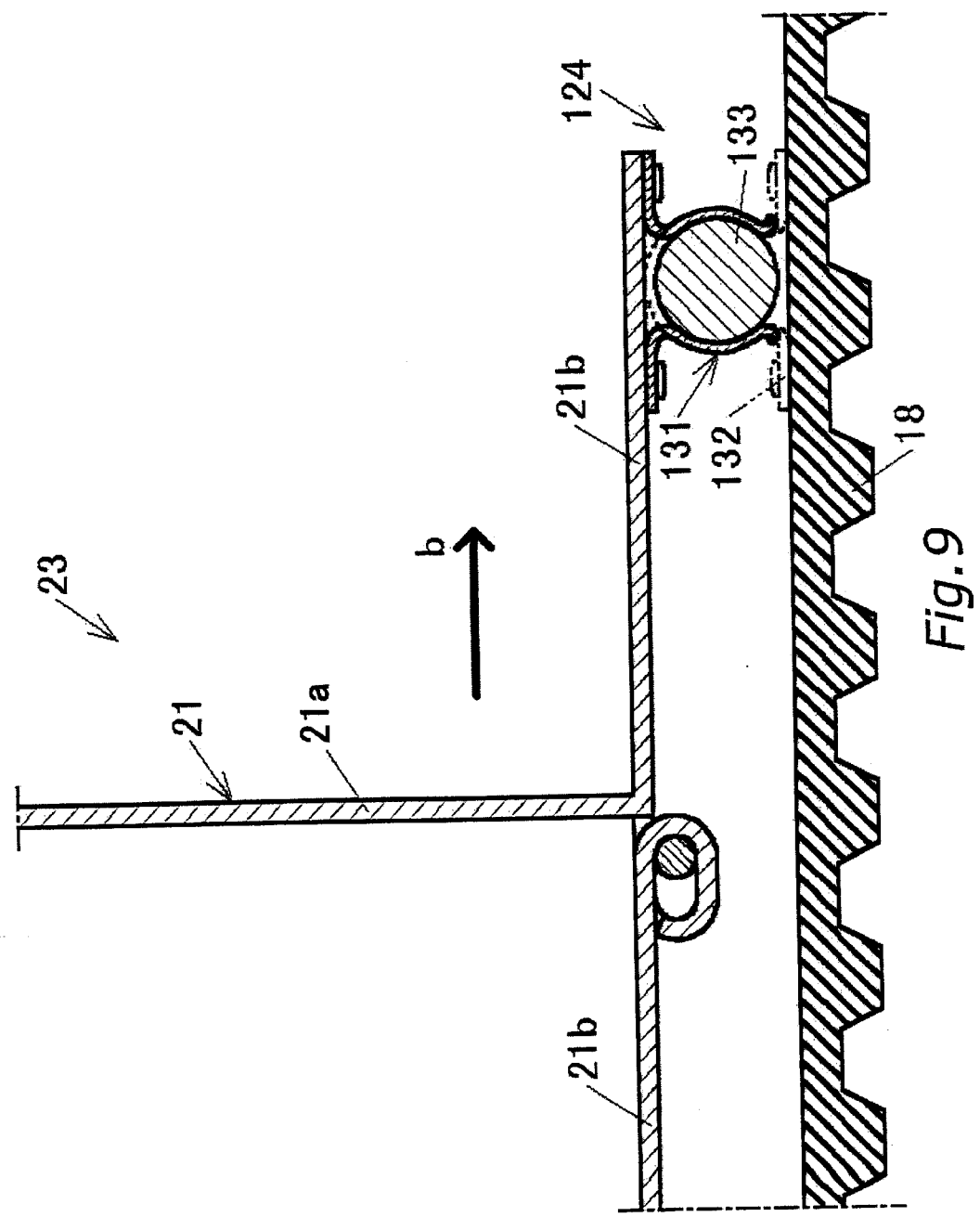
FIG. 9 is an enlarged cross-sectional view of the selected portion of the detaching/attaching mechanism as viewed from the arrow IX—IX in FIG. 8.

In the first embodiment, the detaching/attaching device 24 includes the hook member 31, which is fixed to the second items-group holder 23, and the receptacle 32, which is fixed to the second conveyor belt 18. As shown in FIGS. 8 and 9, the detaching/attaching device 124 can have a holder in other words a clamping member 131 that is elongated in the conveyor width direction, and an axis member 133 that is elongated in the conveyor width direction. The clamping member 131 includes a pair of plate springs that is fixed to the bottom surface of the bottom portion 21b of the partition member 21. The axis member 133 is fixed to the conveyor belt 18 via attachment members 132 and 132. To attach the holder 23 to the conveyor belt 18, the holder 23 is pushed to insert the axis member 133 into the clamping member 131 by enlarging the bottom portion of the clamping member 131. In that case, the clamping member 131 clamps the axis member 133 from its conveyance-direction front and rear. In this manner, the holder 23 is securely supported by the conveyor belt 18 in the cantilever manner. On the other hand, to detach the holder 23, the engagement between the clamping member 131 and the axis member 133 can be disengaged by pulling the holder 23 upward against the clamping force of the clamping member 131.

In this manner, the attaching/detaching operation can be performed from above or below. Therefore, it is easy to detach or attach the holder 23 from or to the conveyor belt 18. Since the number of detaching/attaching devices 24 and 24 is fewer (not shown in figures, but two in front and rear in this embodiment) than the number of partition members 21 . . . 21 (not shown in figures, but six in this embodiment), it is much easier to detach and attach the items-group holders than the case where each of the partition members 21 . . . 21 needs to be individually attached to and detached from the conveyor belts.

Third Embodiment

Next, a third embodiment of the present invention will be explained. To simplify the explanation, only the second items-group holder 23 is mainly explained. Structural elements that are the same as those in the first embodiment are given the same referential numerals as long as doing so does not cause any confusion.

Figure 10:
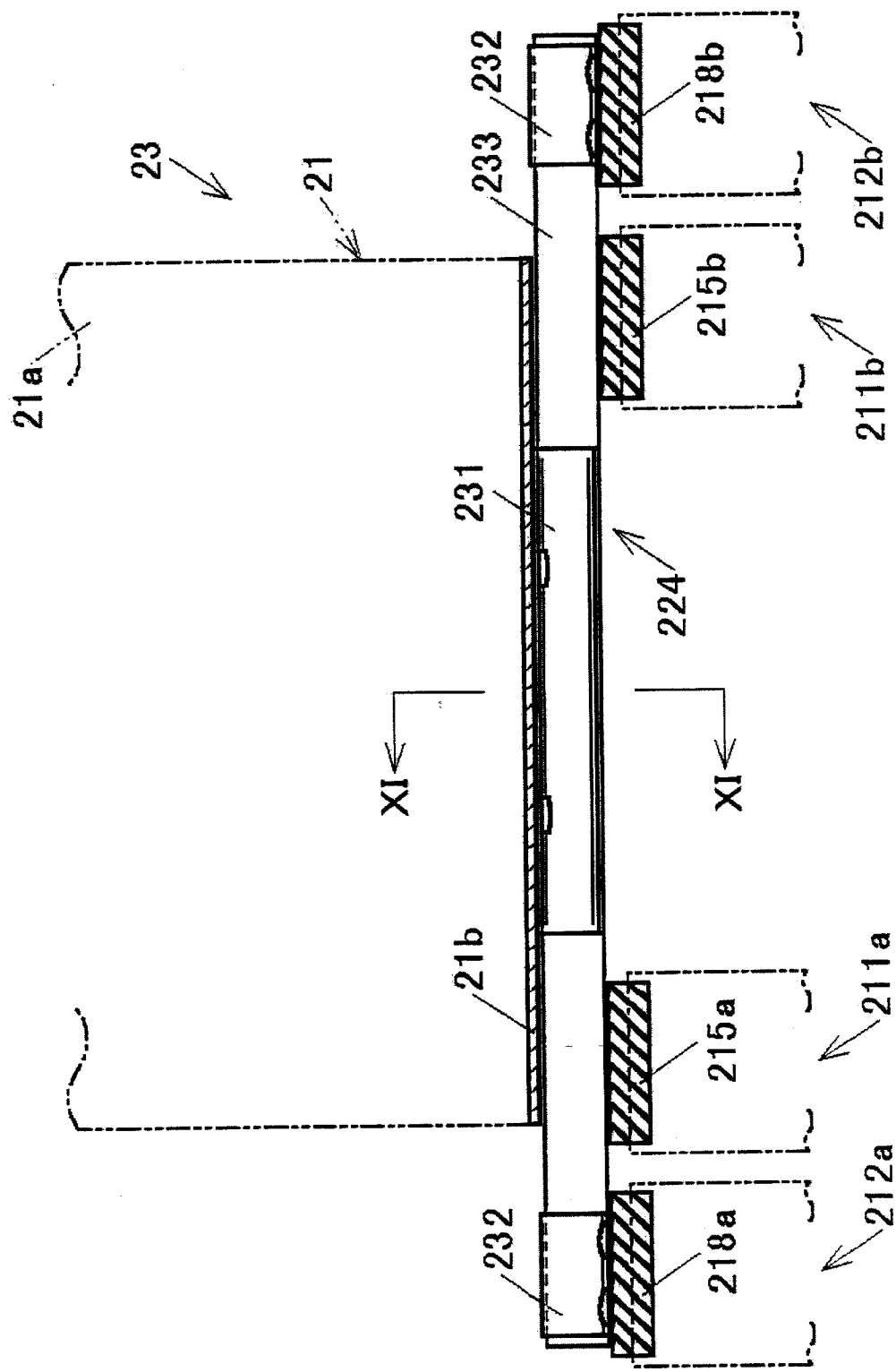
FIG. 10 is a view equivalent to FIG. 6, showing the detaching/attaching mechanism in accordance with a third embodiment of the present invention.
Figure 11:
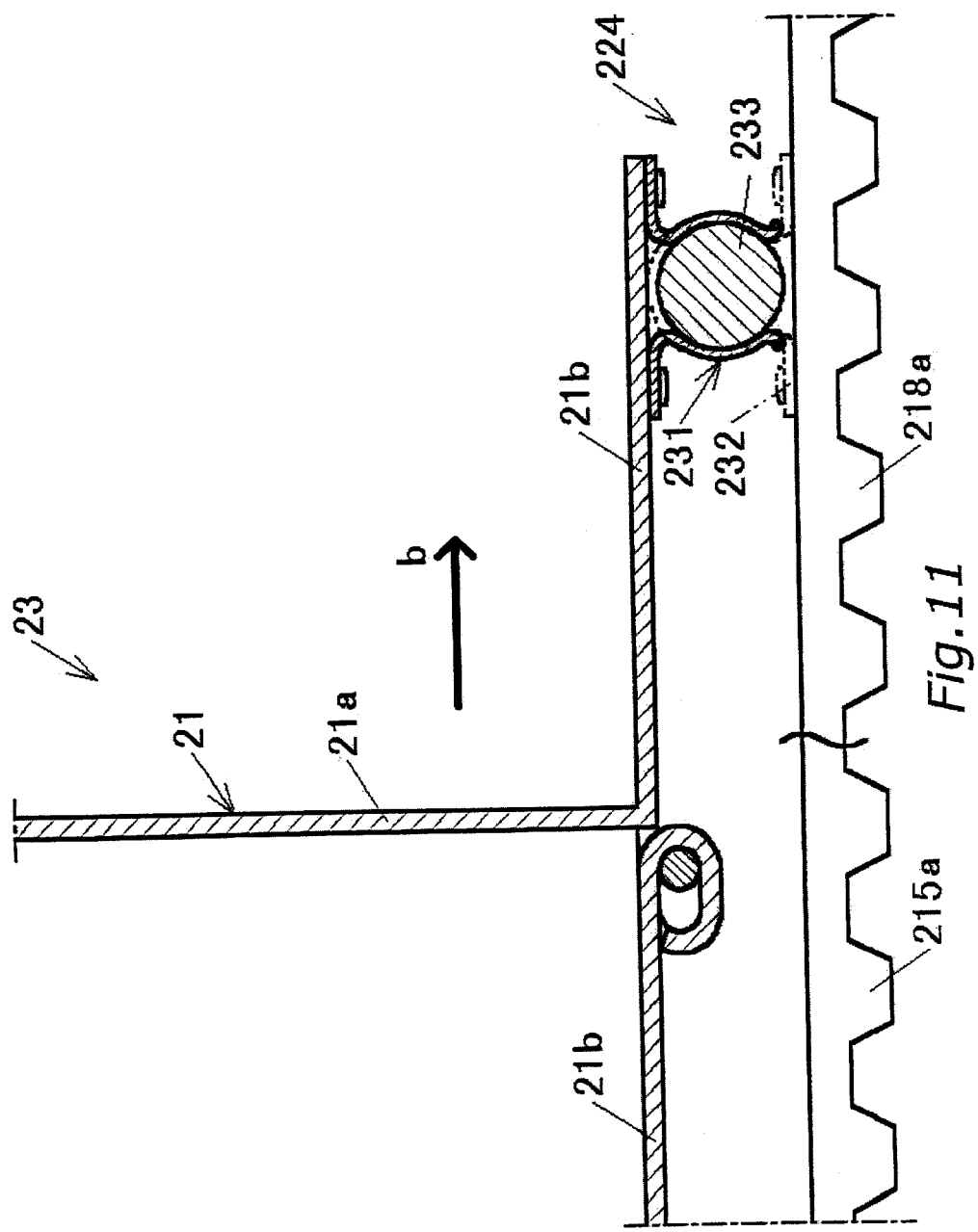
FIG. 11 is an enlarged cross-sectional view of the selected portion of the detaching/attaching mechanism as viewed from the arrow XI—XI in FIG. 10.

In the afore-described first and second embodiments, the second items-group holder 23 is supported by the second conveyor belt 18 in the cantilever manner. However, as shown in FIGS. 10 and 11, the conveyance apparatus can include four conveyors 211a, 211b, 212a, and 212b. Out of four conveyor belts 215a, 215b, 218a, and 218b that correspond to the four conveyors, the second items-group holder 23 can be detachably supported by the second conveyor belts 218a and 218b, which are disposed on the left and right sides, with a pair of detaching/attaching devices 224 and 224 disposed on the front and rear (only the front one is shown) in between the second items-group holder 23 and the second conveyor belts 218a and 218b.

In other words, the detaching/attaching device 224 includes a clamping member 231 and an axis member 233. The clamping member 231 includes a pair of plate springs that is fixed to the holder 23, in other words to the conveyor-width direction center portion of the bottom surface of the bottom portion 21b of the partition member 21. The clamping member 231 is elongated in the conveyor-width direction. The axis member 233 is fixed to the conveyor belts 218a and 218b via attachment members 232 and 232, respectively. The axis member 233 is elongated in the conveyor-width direction. To attach the holder 23 to the conveyor belts 218a and 218b, the holder 23 is pushed to insert the axis member 233 into the clamping member 231 by enlarging the bottom portion of the clamping member 231. In that case, the clamping member 231 clamps the axis member 233 from its conveyance-direction front and rear. In this manner, the holder 23 is securely supported by the conveyor belts 218a and 218b. On the other hand, to detach the holder 23, the engagement between the clamping member 231 and the axis member 233 can be disengaged by pulling the holder 23 upward against the clamping force of the clamping member 231.

In this manner, the attaching/detaching operation can be performed from above or below. Therefore, it is easy to detach or attach the holder 23 from or to the conveyor belts 218a and 218b. Furthermore, the holder 23 is supported on both ends, bridging over the conveyor belts 218a and 218b, which are disposed on left and right ends. Therefore, the second items-group holder 23 can be supported even more stably.

Although the detaching/attaching device 224 of the first items-group holder 22 has not been explained, the first items-group holder 22 has a pair of detaching/attaching devices 224 and 224 that are disposed on the front and rear in between the first items-group holder 22 and the first conveyor belts 215a and 215b, which are disposed on the left side and right side.

Fourth Embodiment

Next, a fourth embodiment of the present invention will be explained. To simplify the explanation, only the structure of the second items-group holder 23 is mainly explained. Structural elements that are the same as those in the first embodiment are given the same referential numerals as long as doing so does not cause any confusion.

Figure 12:
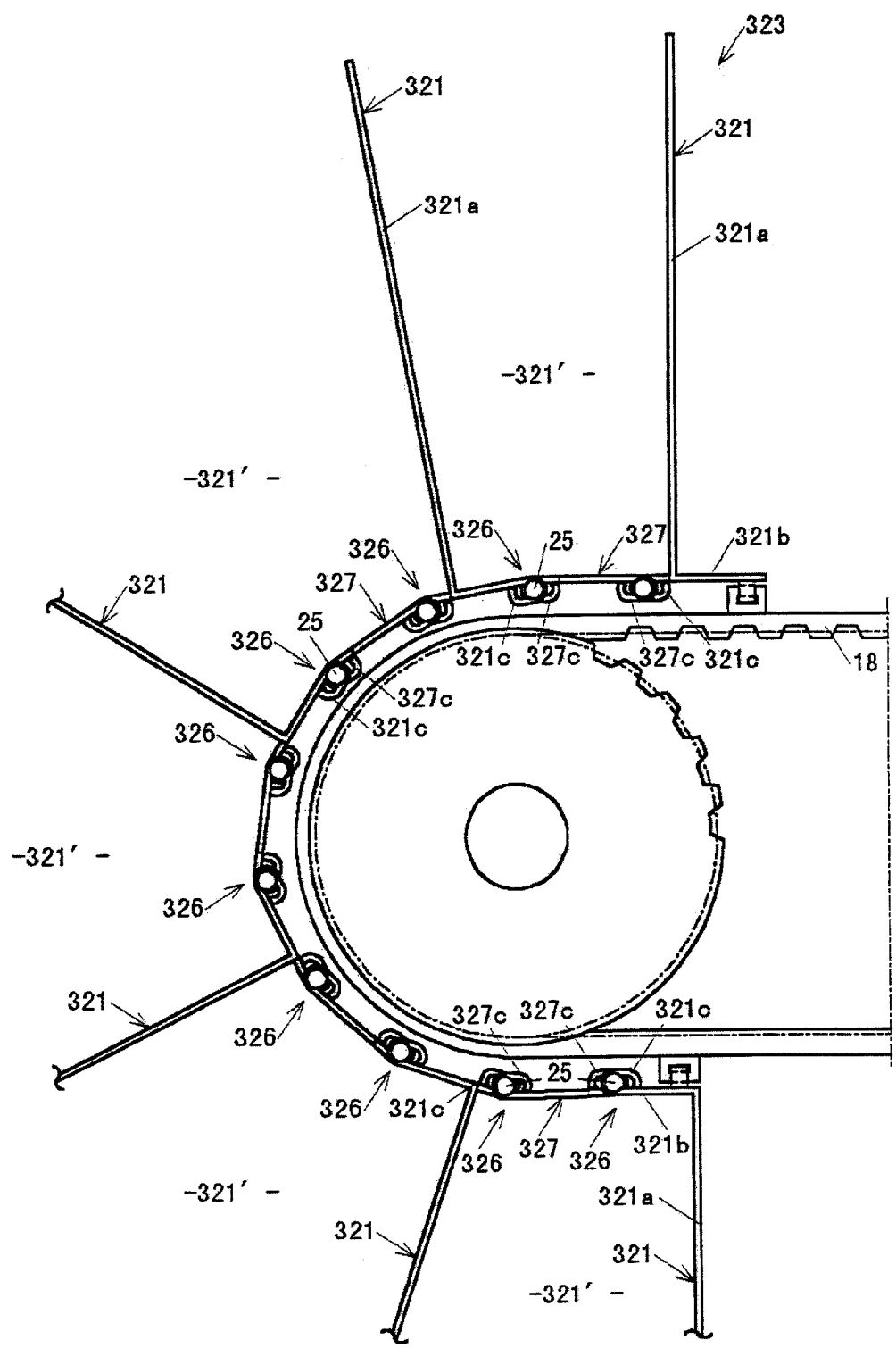
FIG. 12 is a view equivalent to FIG. 3, showing the coupling structure of the partition members in accordance with a fourth embodiment of the present invention.

In the first embodiment, the second items-group holder 23 is formed by connecting the L-shaped partition members 21 . . . 21 via five hinge mechanisms 26 . . . 26. However, as shown in FIG. 12, a greater number of hinge mechanisms 326 . . . 326 (ten in this embodiment) can be utilized.

In other words, six partition members 321 . . . 321 and five coupling members 327 . . . 327 are coupled as one unit, forming a second items-group holder 323. The partition member 321 has a partitioning surface portion 321a and a bottom portion 321b. The conveyance-direction length of the bottom portion 321b is approximately half of that of the bottom portion of the first embodiment. The coupling member 327 has approximately the same size as the bottom portion, and has a plurality of curved portions 327c . . . 327c that is formed on the front and rear. The curved portions 327c . . . 327c each form an oval space. Here, each hinge mechanism 326 includes the curved portions 321c . . . 321c that are formed on the bottom portions 321b . . . 321b of the partition member 321, the curved portions 327c . . . 327c formed on the coupling member 327, and pins 25 that extend through the oval spaces.

In this manner, the holder 323 can adjust to the movement of the second conveyor belt 18 even better, with the holder 323 forming the item holders 321' . . . 321', which have the similar spaces as those in the item holders 21' . . . 21' of the second items-group holder 23 of the first embodiment. Therefore, the holder 323 can be conveyed smoothly, which prevents problems such as shock during the conveyance.

Furthermore, by having the hinge mechanism 326 in which the partition member 21 and the coupling members 327 are coupled via pins 25 that are extractable from the curved portions 321c . . . 321c and 327c . . . 327c, and coupling the partition member 21 and the plurality of coupling members 327 . . . 327 with the hinge mechanism 326, it is possible to easily form the item holder that is sized to match the conveyance-direction length of the item X.

Fifth Embodiment

Next, a fifth embodiment of the present invention will be explained. To simplify the explanation, only a structure that corresponds to the first items-group holder 22 of the first embodiment is mainly explained. Structural elements that are the same as those in the first embodiment are given the same referential numerals as long as doing so does not cause any confusion.

In the hinge mechanism 26 of the first embodiment, adjacent partition members 21 and 21 are rendered movable relative to one another in the conveyance direction due to the curved portions 21c . . . 21c that form the oval spaces in the bottom portion 21b of each partition member 21. Although the first items-group holder 22 has not been explained in detail above, the first items-group holder 22, as the second items-group holder 23, has the detaching/attaching devices 24 and 24 at the front-end and rear-end partition members 21 and 21. The detaching/attaching devices 24 and 24 allow the first items-group holder 22 to be conveyed smoothly following the first conveyor belt 15 even at positions where the first conveyor belt 15 turns around.

Figure 13:
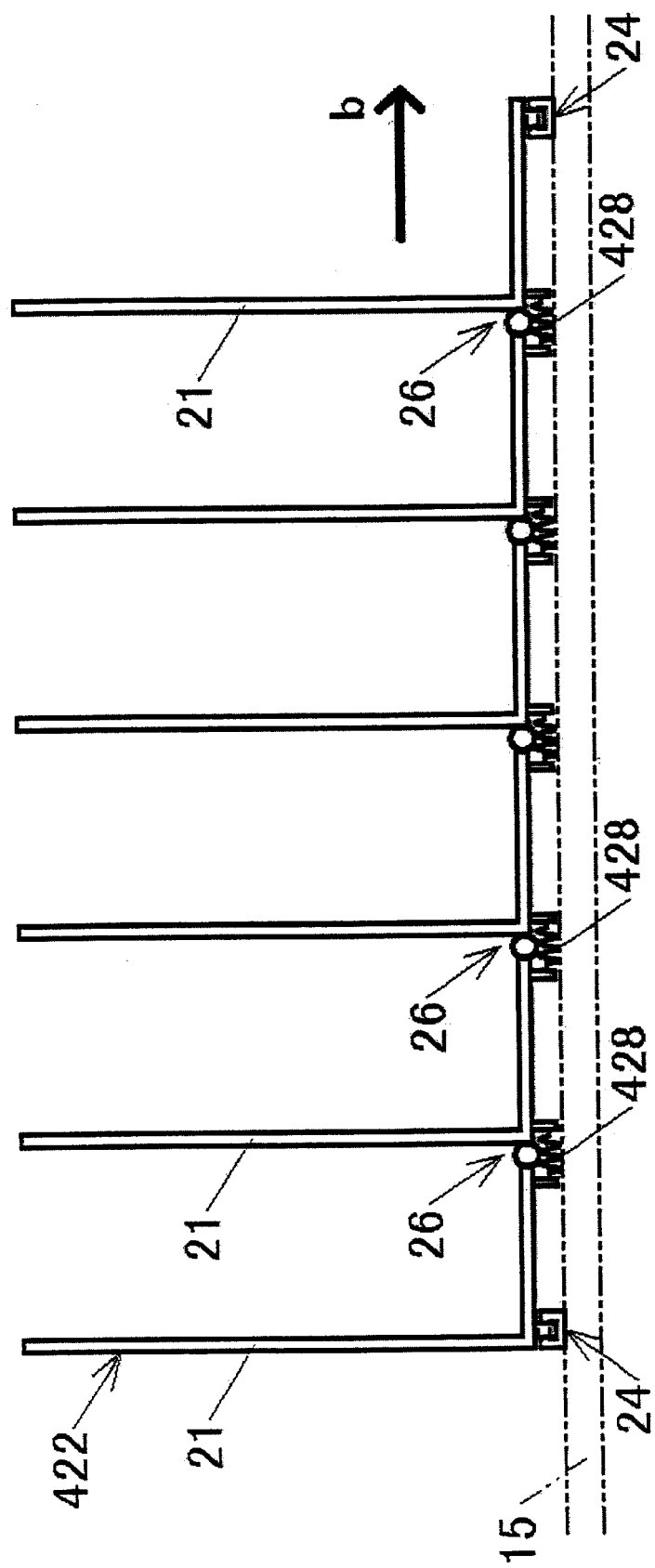
FIG. 13 is a side view of the selected portion of the detaching/attaching mechanism in accordance with a fifth embodiment of the present invention.

In addition, as the first items-group holder 422 shown in FIG. 13, a spring member 428 is interposed in between adjacent partition members 21 and 21 so as to sandwich the hinge mechanism 26. In this manner, the space between the adjacent partition members 21 and 21 narrows smoothly due to the urging force of the spring member 428 where the first conveyor belt 15 operates horizontally. On the other hand, where the first conveyor belt 15 turns around, the space between the adjacent partition members 21 and 21 is widened smoothly against the urging force of the spring member 428. In this manner, the holder 422 follows the first conveyor belt 15 even more favorably.

Sixth Embodiment

Next, a sixth embodiment of the present invention will be explained. To simplify the explanation, only a structure that corresponds to the first items-group holder 22 of the first embodiment is mainly explained. Structural elements that are the same as those in the first embodiment are given the same referential numerals as long as doing so does not cause any confusion.

In the hinge mechanism 26 of the first embodiment, adjacent partition members 21 and 21 are rendered movable relative to one another in the conveyance direction due to the curved portions 21c . . . 21c that form the oval spaces in the bottom portion 21b of each partition member 21. Although the first items-group holder 22 has not been explained in detail above, the first items-group holder 22, as the second items-group holder 23, has the detaching/attaching devices 24 and 24 at the front-end and rear-end partition members 21 and 21. The detaching/attaching devices 24 and 24 allow the first items-group holder 22 to be conveyed smoothly following the first conveyor belt 15 even at positions where the first conveyor belt 15 turns around.

Figure 14:
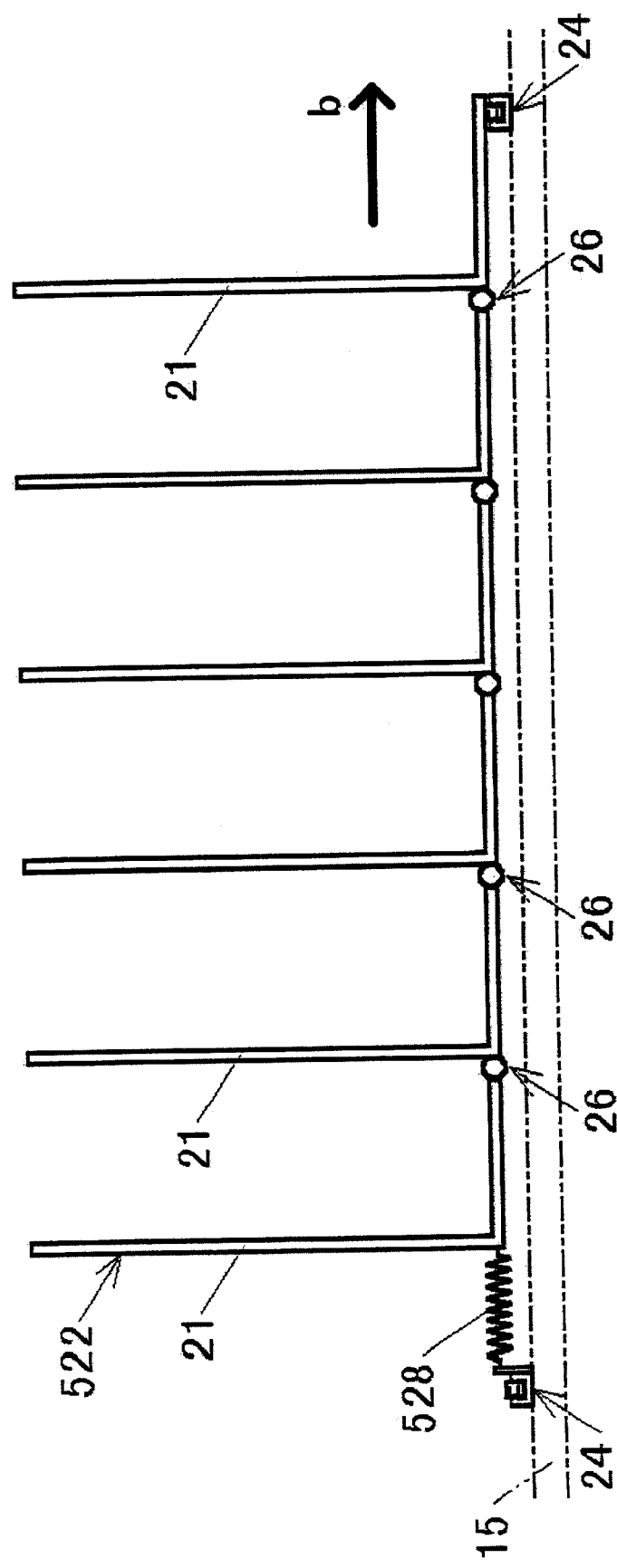
FIG. 14 is a side view of the selected portion of the detaching/attaching mechanism in accordance with a sixth embodiment of the present invention.

Alternatively, as shown in FIG. 14, a spring member 528 can be interposed in between the rear-end partition member 21 of the first items-group holder 522 and the detaching/attaching device 24. Therefore, particularly where the first conveyor belt 15 turns around, the space between the partition member 21 and the detaching/attaching device 24 widens smoothly against the urging force of the spring member 528. This way, the holder member 522 follows the conveyor belt 15 favorably. In this embodiment, the curved portion of the hinge mechanism 26 does not need to form an oval space. Instead, the curved portion can have a circular space.

Furthermore, the structure of the fifth embodiment can be combined with the structure of the sixth embodiment. That is, in the first items-group holder 422 of the fifth embodiment, the spring member 528 of the sixth embodiment can be interposed in between the rear-end partition member 21 and the detaching/attaching device 24.

Seventh Embodiment

Next, a seventh embodiment of the present invention will be explained. To simplify the explanation, structural elements that are the same as those in the first embodiment are given the same referential numerals as long as doing so does not cause any confusion.

Figure 15:
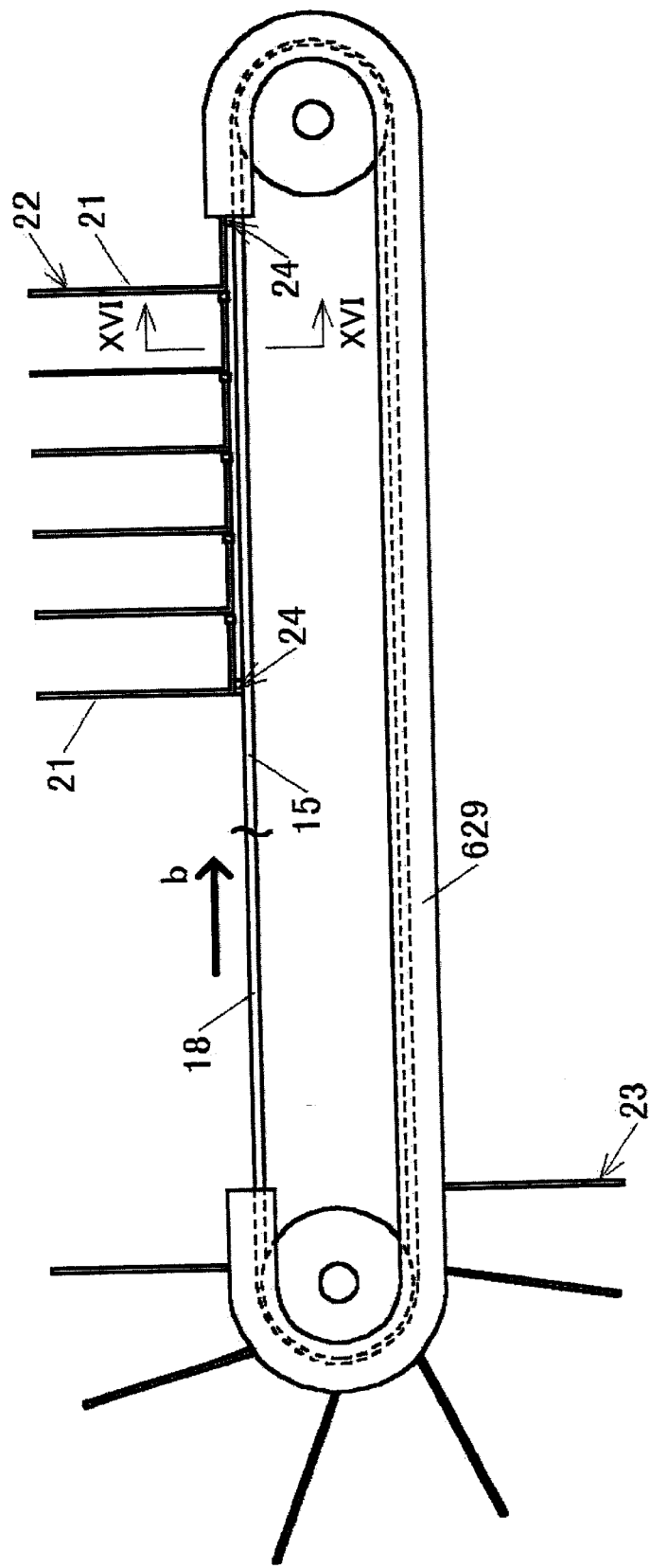
FIG. 15 is a schematic side view of the conveyance apparatus in accordance with a seventh embodiment of the present invention.
Figure 16:
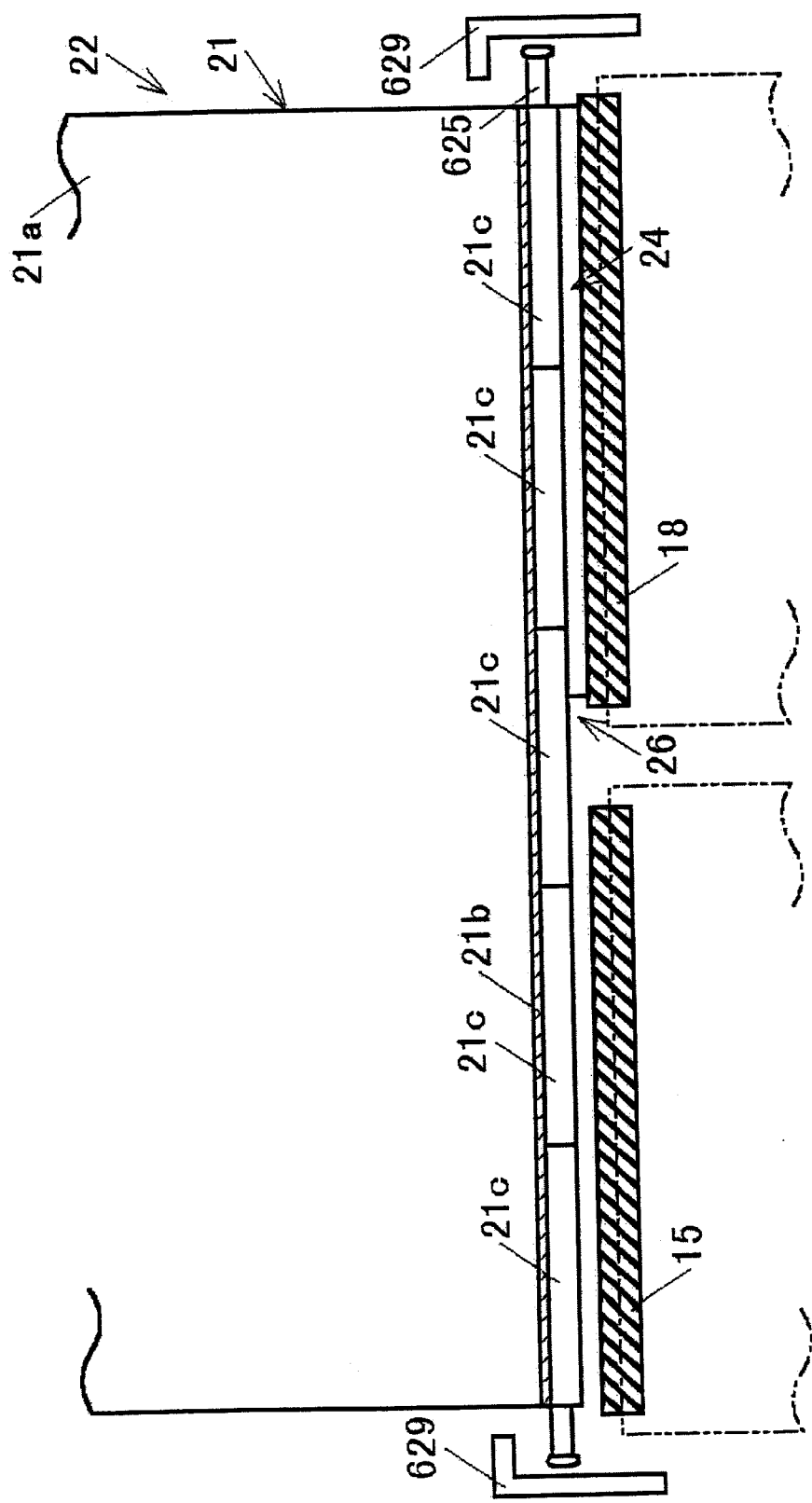
FIG. 16 is an enlarged cross-sectional view of the selected portion of the conveyance apparatus as viewed from the arrow XVI—XVI in FIG. 15.

As shown in FIGS. 15 and 16, restricting members 629 and 629 can be disposed on the left and right sides to cover a predetermined portion of the operating paths of the first and second conveyor belts 15 and 18. The restricting members 629 and 629 prevent each of the items-group holders 22 and 23 (FIG. 16 shows only the first items-group holder) from moving away from their corresponding conveyor belts 15 and 18 by more than a predetermined distance. In this embodiment, the hinge mechanism 26 has pins 625 that extend through the curved portions 21c . . . 21c and stick out from the left and right sides. The hinge mechanism 26 also has the restricting members 629 and 629 that are engageable with the pins 625.

That way, the holders 22 and 23 are prevented from moving excessively away from the conveyor belts 15 and 18; otherwise the holders 22 and 23 may move away from the conveyor belts 15 and 18 due to the centrifugal force where the conveyor belts 15 and 18 turn around, and due to the weight of the holders 22 and 23 themselves where the conveyor belts 15 and 18 operate in the bottom portion. In this manner, the holders 22 and 23 are conveyed even more securely during the high-speed operation.

Other Embodiments

In the first embodiment, the holding parameters, in other words the configurations of the items-group holders 22 and 23 are detected with the second photoelectric sensors 41. Alternatively, other means as discussed below can be utilized.

First, an IC tag in which data such as identification code of items-group holder are stored is attached to an appropriate position of a various type of items-group holders. Each items-group holder can be identified by receiving a signal from the IC tag with a wireless receiver.

Alternatively, bar codes on which data such as identification code of items-group holder are printed are attached to an appropriate position of a various type of items-group holders. Each items-group holder can be identified by reading the bar code with a bar code scanner.

Further, plates in which an engraving or a hole that corresponds to identification code of items-group holder is formed are attached to an appropriate position of a various type of items-group holders. Each items-group holder can be identified by reading the engraving or the hole with photoelectric sensors.

In either of the cases described above, the CPU 61a retrieves the control parameter that corresponds to the identification code from the database stored in the memory 61b. Then, the CPU 61a can perform controls such as driving of the conveyor belts based on the control parameter.

In the first embodiment, the first and second conveyor belts 15 and 18 are operated intermittently at the loading position P1. However, the first and second conveyor belts 15 and 18 can be operated at a reduced speed, such that the items X X can be loaded onto each of the items-group holder 22 and 23 from the loading conveyor 2 in the meantime. In the first embodiment, the first and second conveyor belts 15 and 18 are operated intermittently at the discharge position P2. However, the first and second conveyor belts 15 and 18 can be operated at a reduced speed, such that the items X . . . X can be discharged by the pusher member 51 in the meantime.

In the first embodiment, the hook member 31 is fixed to the second items-group holder 23, while the receptacle 32 is fixed to the second conveyor belt 18. Alternatively, the hook member 31 can be fixed to the conveyor belt 18, with the receptacle 32 being fixed to the holder 23. Similarly, in the second embodiment, the clamping member 131 can be fixed to the second conveyor belt 18, with the axis member 133 being fixed to the second items-group holder 23. Further, in the third embodiment, the clamping member 231 can be fixed to the second conveyor belts 218a and 218b, with the axis member 233 being fixed to the second items-group holder 23.

In the first embodiment, the first photoelectric sensors 5 detect the items X . . . X that are loaded onto the conveyance apparatus 1. The first photoelectric sensors 5 can be omitted. At the same time, the second photoelectric sensors 41 can be positioned as drawn in chain line in FIG. 2, such that the first photoelectric sensors 5 detect both the items X . . . X and the holding parameters of the items-group holders.

In the first embodiment, two detaching/attaching devices 24 and 24 are provided on each the first and second items-group holders 22 and 23, on the front and rear. In between these detaching/attaching devices 24 and 24, there can be provided a plurality of detaching/attaching devices 24 . . . 24 that is fewer in number than the number of the partition members 21 . . . 21. In this manner, the items-group holders 22 and 23 can be supported by the conveyor belts 15 and 18 even more securely, without making the operation of detaching and reattaching the items-group holders 22 and 23 too burdensome.

Furthermore, although the guiding table 6 is disposed in between the conveyance apparatus 1 and the unloading conveyor 4 in the first embodiment, this guiding table 6 can be omitted.

Still furthermore, the loading conveyor 2 and the conveyance apparatus 1 are disposed in series in the first embodiment. However, as shown in chain line in FIG. 1, the loading conveyor 2 can be disposed such that the items X can be loaded from a side of the conveyance apparatus 1 in the direction of arrow "a'." In this manner, the flexibility in the lay-out of the boxing and the flexibility in items-conveyance position increase. In other words, where the loading conveyor 2 is disposed as shown in the solid line, the items X . . . X are conveyed and boxed while in the vertically-placed position. On the other hand, where the loading conveyor 2 is disposed as shown in the chain line, the items X . . . X are conveyed and boxed while in the laterally-placed position.

Furthermore, in the first embodiment, the items-group holders 22 and 23 are all detachable from and reattachable to the conveyor belts 15 and 18. However, the six of the partition members 21 do not have to be detached or reattached all at once. For instance, the items-group holder can be formed by a pair of assemblies of partition members 21 . . . 21 that is coupled to one another, with each assembly having three partition members 21 . . . 21 that are coupled to one another. In that case, when the items-group holder is detached from or reattached to the conveyor belts 15 and 18, the two assemblies can be detached from or reattached to the conveyor belts 15 and 18 one by one.

Since a plurality of partition members that is coupled to one another is rendered detachable from and reattachable to the annular conveyance member in this invention, it is possible to replace the plurality of partition members of the conveyance apparatus easily and quickly.

"Means plus function" clauses as utilized in the specification and claims should include any structure or hardware and/or algorithm or software that can be utilized to carry out the function of the "means plus function" clause.

The terms of degree such as "substantially," "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2001-294620. The entire disclosure of Japanese Patent Application No. 2001-294620 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A conveyance apparatus for holding and conveying a group of items in a conveyance-direction, comprising:
   a first conveyor, including
      a first roller,
      a first conveyance member wound around said first roller,
      a first items-group holder for conveying the group of items, said first items-group holder having a plurality of partition members that is directly connected to one another via a hinge mechanism, and
      a first detaching/attaching mechanism disposed between said first conveyance member and said first items-group holder for detachably and reattachably coupling said first items-group holder to said first conveyance member, such that said first items-group holder can be detached from said first conveyance member by merely operating said first detaching/attaching mechanism to detach said first items-group holder from said first conveyance member.

2. The conveyance apparatus as set forth in claim 1, wherein
   said first detaching/attaching mechanism includes a plurality of detaching/attaching devices, a number of said detaching/attaching devices being fewer than a number of said partition members.

3. The conveyance apparatus as set forth in claim 2, wherein
   each of said plurality of first detaching/attaching devices includes a clamping member and a clamped member that is clamped by said clamping member.

4. The conveyance apparatus as set forth in claim 3, wherein
   said clamping member is fixedly coupled to said first conveyance member, and
   said clamped member is fixedly coupled to said partition member.

5. The conveyance apparatus as set forth in claim 3, wherein
   said clamping member is formed by an elastic body, and
   said clamped member is formed by an axis member that is clamped by said clamping member from the front and the rear in the conveyance-direction.

6. The conveyance apparatus as set forth in claim 3, wherein
   said clamping member is formed by an elastic body, and
   said clamped member includes an engagement portion that is clamped by said clamping member from sides in a direction of the width of said conveyance member.

7. The conveyance apparatus as set forth in claim 1, wherein
   said first detaching/attaching mechanism can render said plurality of partition members detachable from and attachable to said first conveyance member all at once.

8. The conveyance apparatus as set forth in one of claim 1, wherein
each of said partition members has a bottom portion and a partition surface portion that projects upright from said bottom portion, and
said bottom portions of said plurality of partition members are connected to one another.

9. The conveyance apparatus as set forth in claim 8, wherein
said bottom portions of said plurality of partition members are connected to one another via said hinge mechanism.

10. The conveyance apparatus as set forth in claim 1, further comprising
a second conveyor, including
a second roller,
a second conveyance member wound around said second roller,
a second items-group holder for conveying the group of items, said second items-group holder having a plurality of partition members that is connected to one another, and
a second detaching/attaching mechanism disposed between said second conveyance member and said second items-group holder for detachably and reattachably coupling said second items-group holder to said second conveyance member,
said partition members of said first and second items-group holders being divided into a plurality of assemblies of partition members, and
at least two adjacent assemblies out of said plurality of assemblies being supported by different conveyance members.

11. A boxing system for boxing a group of items in a container, comprising:
said conveyance apparatus as set forth in claim 1;
a loading apparatus for loading items onto said conveyance apparatus at a loading position; and
an unloading apparatus for unloading the group of items conveyed by said conveyance apparatus to a container at a discharge position.

12. A conveyance apparatus for holding and conveying a group of items in a conveyance-direction, comprising:
a first conveyor, including
a first roller,
a first conveyance member wound around said first roller,
a first items-group holder for conveying the group of items, said first items-group holder having a plurality of partition members that is connected to one another, and
a first detaching/attaching mechanism disposed between said first conveyance member and said first items-group holder for detachably and reattachably coupling said first items-group holder to said first conveyance member;
a first driving device for driving said first roller;
a detecting device for detecting conveyance of at least one of said plurality of partition members and the group of items and producing a detection signal; and
a control system including
memory means operatively coupled to said detecting device to receive the detection signals and store the detection signals as holding parameters, and
driving control means operatively coupled to said first driving device to control driving of said first roller based on the holding parameters.

13. A boxing system for boxing a group of items in a container, comprising:
said conveyance apparatus as set forth in claim 12;
a loading apparatus for loading items onto said conveyance apparatus at a loading position; and
an unloading apparatus for unloading the group of items conveyed by said conveyance apparatus to a container at a discharge position.

14. A conveyance apparatus for holding and conveying a group of items in a conveyance-direction, comprising
a first conveyor, including
a first roller,
a first conveyance member wound around said first roller,
a first items-group holder for conveying the group of items, said first items-group holder having a plurality of partition members that is connected to one another, and
a first detaching/attaching mechanism disposed between said first conveyance member and said first items-group holder for detachably and reattachably coupling said first items-group holder to said first conveyance member;
a second conveyor, including
a second roller,
a second conveyance member wound around said second roller,
a second items-group holder for conveying the group of items, said second items-group holder having a plurality of partition members that is connected to one another, and
a second detaching/attaching mechanism disposed between said second conveyance member and said second items-group holder for detachably and reattachably coupling said second items-group holder to said second conveyance member;
a first driving device for driving said first roller;
a second driving device for driving said second roller;
a detecting device for detecting conveyance of at least one of said plurality of partition members and the group of items and producing a detection signal; and
a control system including
memory means operatively coupled to said detecting device to receive the detection signals and store the detection signals as holding parameters, and
driving control means operatively coupled to said first and second driving devices to control driving of said first and second rollers independently based on the holding parameters,
said partition members of said first and second items-group holders being divided into a plurality of assemblies of partition members,
at least two adjacent assemblies out of said plurality of assemblies being supported by different conveyance members.

15. A boxing system for boxing a group of items in a container, comprising:
said conveyance apparatus as set forth in claim 14;
a loading apparatus for loading items onto said conveyance apparatus at a loading position; and
an unloading apparatus for unloading the group of items conveyed by said conveyance apparatus to a container at a discharge position.

* * * * *